US009248636B2

(12) United States Patent
Schindler, II

(10) Patent No.: US 9,248,636 B2
(45) Date of Patent: Feb. 2, 2016

(54) FORMING A STRUCTURAL LAMINATE THAT RESISTS STRESS

(71) Applicant: Roland R. Schindler, II, Pittsford, NY (US)

(72) Inventor: Roland R. Schindler, II, Pittsford, NY (US)

(73) Assignee: EASTMAN KODAK COMPANY, Rochester, NY (US)

(*) Notice: Subject to any disclaimer, the term of this patent is extended or adjusted under 35 U.S.C. 154(b) by 628 days.

(21) Appl. No.: 13/663,522

(22) Filed: Oct. 30, 2012

(65) Prior Publication Data
US 2013/0292030 A1 Nov. 7, 2013

Related U.S. Application Data

(60) Provisional application No. 61/640,914, filed on May 1, 2012.

(51) Int. Cl.
B29C 65/78 (2006.01)
B32B 37/10 (2006.01)
B32B 37/14 (2006.01)
B32B 38/14 (2006.01)
(Continued)

(52) U.S. Cl.
CPC .............. B32B 37/1292 (2013.01); B31B 1/00 (2013.01); B31B 2201/88 (2013.01); B31B 2201/95 (2013.01); B31B 2203/084 (2013.01); B31B 2217/0084 (2013.01); B31B 2217/084 (2013.01); B32B 2307/718 (2013.01); B32B 2309/02 (2013.01); B32B 2309/105 (2013.01); B32B 2310/0831 (2013.01); B32B 2317/127 (2013.01); Y10T 156/10 (2015.01); Y10T 156/1737 (2015.01); Y10T 156/1741 (2015.01)

(58) Field of Classification Search
CPC .. B31B 1/00; B31B 2201/88; B31B 2201/95; B31B 2203/084; B31B 2217/0084; B31B 2217/084; B32B 2307/718; B32B 2309/02; B32B 2309/105; B32B 2310/0831; B32B 2317/127; B32B 37/1292; B32B 37/10; Y10T 156/10; Y10T 156/1737; Y10T 156/1741
See application file for complete search history.

(56) References Cited

U.S. PATENT DOCUMENTS 4,086,116 A 4/1978 Yazaki et al.
4,579,767 A 4/1986 Coggan et al.
(Continued)

OTHER PUBLICATIONS

Technical bulletin CSS-011-93 "General Properties of Coroplast Plastic Sheets" at http://www.coroplast.com/technicalinfo/prodproperties.htm.

Primary Examiner — Sonya Mazumdar
(74) Attorney, Agent, or Firm — Christopher J. White; Nelson A. Blish; William R. Zimmerli

(57) ABSTRACT

A structural laminate having a selected resistance to a first stress applied in a selected first stress direction relative to the laminate is formed from first and second sheets. A selected volume of toner is deposited on the first sheet to form a deposited toner pattern, the deposited toner pattern being disposed over a selected first surface area of the first sheet and extending normal to the first sheet by a selected first height. The second sheet, or toner thereon, is brought into contact with the deposited toner pattern. The deposited toner pattern is fixed to produce a fixed toner pattern that adheres the second sheet to the first sheet, in that way forming the laminate. The fixed toner pattern includes one or more first contiguous regions of toner extending in a direction within about 45° of the stress direction, so that the contiguous regions resist the applied stress.

22 Claims, 16 Drawing Sheets

(51) Int. Cl.
*B32B 37/12* (2006.01)
*B31B 1/00* (2006.01)
*B32B 37/18* (2006.01)
*C09J 9/00* (2006.01)

(56) References Cited

U.S. PATENT DOCUMENTS

| | | | |
|---|---|---|---|
| 4,581,255 A | 4/1986 | Coggan et al. | |
| 5,280,901 A | 1/1994 | Smith et al. | |
| 5,392,104 A | 2/1995 | Johnson | |
| 5,531,429 A | 7/1996 | Clark | |
| 6,181,908 B1 | 1/2001 | Leemhuis et al. | |
| 6,535,703 B2 | 3/2003 | Yamamoto et al. | |
| 6,608,641 B1 | 8/2003 | Alexandrovich et al. | |
| 6,993,269 B2 * | 1/2006 | Yamauchi | B41J 3/4073 399/130 |
| 7,181,878 B2 | 2/2007 | Tucker | |
| 7,435,312 B2 | 10/2008 | Lindsay et al. | |
| 7,894,766 B2 | 2/2011 | Tsuchiya | |
| 2005/0073570 A1 | 4/2005 | Alden | |
| 2006/0148631 A1 | 7/2006 | Protocsnak et al. | |
| 2007/0077400 A1 | 4/2007 | Crum | |
| 2007/0146734 A1 * | 6/2007 | Taniuchi | B29C 67/0059 358/1.1 |
| 2007/0196600 A1 | 8/2007 | Hutchinson et al. | |
| 2008/0002011 A1 * | 1/2008 | Mizutani | B31B 1/88 347/104 |
| 2008/0159786 A1 | 7/2008 | Tombs et al. | |
| 2009/0053449 A1 * | 2/2009 | Hannington | C09J 7/0203 428/41.8 |
| 2010/0051165 A1 * | 3/2010 | Tombs | H05K 3/1266 156/60 |
| 2010/0167082 A1 * | 7/2010 | Oh | D21H 19/02 428/608 |
| 2011/0104386 A1 | 5/2011 | Tutt et al. | |
| 2011/0159243 A1 * | 6/2011 | Ahn | B44F 7/00 428/164 |

* cited by examiner

FORMING A STRUCTURAL LAMINATE THAT RESISTS STRESS

CROSS-REFERENCE TO RELATED APPLICATIONS

This application claims priority of provisional Patent Application No. 61,640,914(now 13/663,522, U.S. Publication No. 2013/0292030), filed May 1, 2012.

This application is co-filed with and has related subject matter to U.S. patent application No. 61/640,909(now 13/663,514, U.S. Publication No. 2013/0292053), filed May 1, 2012, titled "FORMING A STRUCTURAL LAMINATE," and U.S. patent application No. 61/640,929(now 13/663,529, U.S. Publication No. 2013/0292049), filed May 1, 2012, titled "FORMING A 3D STRUCTURAL LAMINATE," each of which is incorporated herein by reference in its entirety.

FIELD OF THE INVENTION

This invention pertains to the field of printed manufacturing and more particularly to printing structural elements.

BACKGROUND OF THE INVENTION

Corrugated cardboard or fiberboard is widely used to package goods for transit. An outer sheet of liner (or "linerboard") is glued to a fluted sheet to provide stiffness in the direction in which the flutes extend. A second outer sheet of liner can be glued to the fluted sheet opposite the first outer sheet to provide stiffness in the direction perpendicular to the flutes.

Moreover, markings are often printed on corrugated stock. For example, shipping boxes can be printed with edge-crush strength, gross weight, fragile, or this-end-up indicators. Printers typically operate using subtractive color: a substantially reflective receiver (piece of corrugated stock) is overcoated image-wise with cyan (C), magenta (M), yellow (Y), black (K), and other colorants. For example, U.S. Publication No. 2008/0159786 by Tombs et al., entitled "Selective printing of raised information by electrography," published Jul. 3, 2008, the disclosure of which is incorporated herein by reference, describes electrophotographic printing using marking particles of a substantially larger size than the standard size marking particles of the desired print image. Tombs et al. also describe using non-pigmented ("clear") marking particles to overlay raised information on an image. Markings can include multiple types of content. For example, a box can be printed with text, halftoned photographs, and line-art or other graphics.

Numerous schemes for manufacturing corrugated board have been developed. However, all conventional fluted cardboard has certain mechanical properties in certain dimensions, and those properties cannot readily be adjusted depending on the type of product to be packaged. For example, referring to FIG. 3A, a standard cardboard box is generally formed by stamping box blank 301 from a rectangular sheet of corrugated board. Box blank 301 is then folded along fold lines 302, and front surface 303 of tab 304 is glued to back surface 305 to form a manufacturer's joint. As a result, the direction F of extension of flutes 306 (FIG. 3B) is set across the entire box. The designer of the box cannot align flutes differently in different portions of the box. This restricts the box designer's freedom to adjust the mechanical characteristics of the box based on its intended use. For example, a box may need to have comparable strengths in the X and Y directions, corresponding to the horizontal portions of the box, but may need enhanced strength along the Z-direction in the vertical portion to permit the stacking of boxes without increasing the weight of the box unnecessarily. This relative strength configuration cannot be provided by conventional ways of making corrugated board, or by ways of making extruded plastic corrugations such as COROPLAST.

FIG. 3B also shows first liner sheet 310, second liner sheet 311, and fluted sheet 312 between them. Starch glue is conventionally applied at each area of contact between fluted sheet 312 and liner sheets 310 or 311.

Presently, shipping departments of companies need to stock a wide variety of boxes in order to ship products to customers. The boxes should be close in size, but larger than, the product to ship. Extra space in each box is filled with packing materials that add additional weight and cost. In addition, maintaining inventory of the packaging materials and boxes cost money and takes up space. It would be preferable to form a box that accurately fits the specific items to be shipped.

Moreover, the adhesives used in corrugated-box manufacturing have deficiencies. Starch-based adhesives are commonly used, but are water-soluble. Epoxy, glue and hot-melt glue change volume when they cool, producing internal stresses that can weaken the board.

There is, therefore, a need for ways of making corrugated board and packages that permit adjusting the mechanical properties and the directions in which those properties are effective. There is also a need for ways of making board using durable adhesives that do not create internal stresses in the board.

The disclosure of U.S. Patent Publication No. 2007/0196600 by Hutchinson et al. is incorporated herein by reference.

SUMMARY OF THE INVENTION

According to an aspect of the present invention, there is provided a method of forming a structural laminate having a selected resistance to a first stress applied in a selected first stress direction relative to the structural laminate, the method comprising:

a) receiving first and second sheets;

b) depositing on the first sheet a selected volume of toner to form a deposited toner pattern, the deposited toner pattern being disposed over a selected first surface area of the first sheet and extending normal to the first sheet by a selected first height;

c) bringing the second sheet, or toner thereon, into contact with the deposited toner pattern;

d) forming the structural laminate by fixing the deposited toner pattern to produce a fixed toner pattern that adheres the second sheet to the first sheet, wherein the fixed toner pattern includes one or more first contiguous regions of toner extending in a direction within about 45° of the first stress direction, so that the one or more first contiguous regions resist the first applied stress.

An advantage of this invention is that it provides a structural laminate or element that can be readily produced and that provides improved mechanical properties in a desired area of the structure. Toner is used to adhere the sheets together. A smaller mass of toner than of some other adhesives can be used to adhere the sheets together, reducing mass and weight of the structure. Since toner is used, the sheets do not have to be pressed so tightly together during bonding that there is a risk of squeezing the adhesive out. This is an advantage over glue.

Unlike glue, hot-melt glue, or rubber cement, toner is stiff (not compliant) after fixing, advantageously reducing the severity of creep in the structure. This also provides the advantage that the dimensions of the deposited toner pattern stay consistent after fixing. For example, lines a certain distance apart will remain that distance apart, which they might not under load if an elastomeric adhesive were used.

Unlike glue or epoxy, toner makes a separable bond. This permits readily recycling a toner structure when it reaches the end of its useful life. However, the toner bond remains strong until heat or other external forces are applied to separate it.

Moreover, toner provides a stronger adhesive bond than hot-melt inkjet inks and similar materials. Toner permits building thicker structures than other adhesives, which in turn provides improved bending moment compared to thinner structures. Furthermore, toner structures do not weaken as they become thicker in the way that structures using conventional adhesives do. Conventional adhesives wet and thus spread over the surfaces that they contact. Therefore, such adhesives have lower surface energies than the sheet. As a result, glue is effective largely because common sheet materials are microscopically rough. This also means that adhesive failures tend to be cohesive rather than adhesive. That is, the glue does not delaminate from the sheet, but the glue fails in the center of the bulk of glue. The higher the mass of the bulk of glue, the more opportunity there is for a fracture to occur in that bulk. In contrast, fixed toner is generally stronger than the sheet, so adhesive failures involving toner tend to result from tearing of the fibers of the sheet rather than cracking of the toner mass. The toner is therefore not the weakest link in the adhesion.

In various embodiments (e.g., as shown in FIG. 1), a belt carries sheets through a toner printer. This permits building up thicker structures than printers that wrap the sheets around a drum. In various embodiments, an intermediate transfer member is used to permit passing the sheets through the printer without bending or deforming them.

Unlike epoxy, toner does not change in volume while it transitions from the rubbery to the glassy state. Toner is amorphous plastic, not wax. This advantageously reduces the variation between the structure as designed and the structure as produced after fixing. Toner undergoes reduced dimensional shift during the process of making the structure, compared to other adhesives. For example, hot-melt glue reduces in volume by approximately 10% as it solidifies, and aqueous glue (e.g., ELMER'S) also reduces in volume while drying. This reduction in volume can create internal stresses that weaken a structure. The stresses are transferred at least in part to the sheets, moving the adhesive and the sheets up the stress-strain curve towards the fracture point. Hot melt adhesives cool to a point close to the fracture point on a stress/strain curve. Toner structures according to various embodiments do not experience these stresses. During fixing, toner does spread and smear, e.g., undergoing a ~50% increase in dot size laterally. However, this increase does not create stresses on the sheets. Moreover, the increase is predictable and consistent, so patterns can be readily designed to compensate for this effect. The predictability of this effect can also reduce the probability of localized weak spots that serve as failure nuclei. This effect means that in toner structures, the volume of non-structural mass between toner structures is preserved. The strength of a structure is proportional to the toner density per unit area. Only volume-preserving adhesives (no phase transition, evaporation, cross-linking) provide the design strength after manufacturing.

Moreover, toner does not undergo a phase transition during fixing. Therefore, it does not release heat, unlike epoxy. This permits making structures using sheet materials that are sensitive to localized heat release. Toner also does not release solvents or volatile organic compounds during fixing. This permits making structures without requiring vapor enclosures.

Toner can be readily positioned precisely (e.g., within $\frac{1}{600}$") to form desired patterns, unlike glue or (especially) epoxy. Toner can also be substantially less expensive than epoxy.

In various embodiments, multiple toner regions are used to control tensile strength and bending moment independently. Unlike glue, the size (thickness), contents (additives), and position of toner patterns can be readily controlled. Moreover, stiffness varies as the square of the second moment of inertia, or as thickness$^4$. The direction of stiffness can be controlled by selecting an appropriate toner pattern. Unlike prior schemes using toner as an adhesive between surfaces substantially in contact with each other, various embodiments described herein use toner to hold sheets in relationship to each other, with a gap between them. Toner can provide tall structures with low mass, no outgassing, and strength along any number of axes. Conventional corrugated board has high mass and provides strength only along one axis or very few axes (e.g., two: tensile with the flutes, and normal to the board). Foaming posterboard outgasses, so it requires more care in handling during production. In various embodiments, a single layer of toner is used on the sheet rather than multiple layers. This improves productivity of the printer producing the structures. In various embodiments, the toner is a weather-resistant source of strength for wet paper, e.g., lawn signs.

In various embodiments, laminates or elements can be made at a customer's site to the customer's specifications.

BRIEF DESCRIPTION OF THE DRAWINGS

The above and other objects, features, and advantages of the present invention will become more apparent when taken in conjunction with the following description and drawings wherein identical reference numerals have been used, where possible, to designate identical features that are common to the figures, and wherein.

The attached drawings are for purposes of illustration and are not necessarily to scale.

DETAILED DESCRIPTION OF THE INVENTION

As used herein, the terms "receiver," "receivers," "medium," "media," "recording medium," and "recording media" are used interchangeably. "Sheet" and "web" receivers are used interchangeably except when discussing embodiments that are particularly adapted to use one of those styles of receiver. "Adhere" is used herein both intransitively (toner adheres to paper) and transitively (toner adheres two sheets to each other, i.e., the adhesive forces between a toner mass and each of two sheets holds those two sheets together).

Figure 3A:
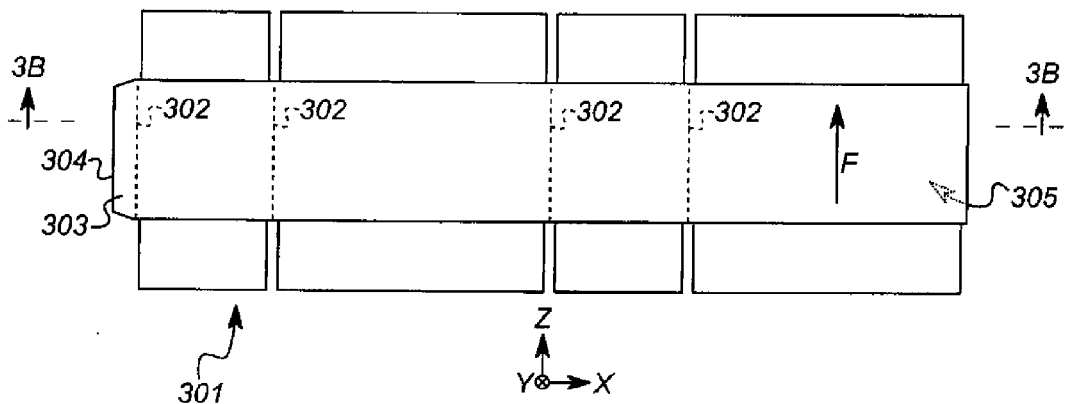
FIG. 3A shows a conventional corrugated box blank.
Figure 3B:
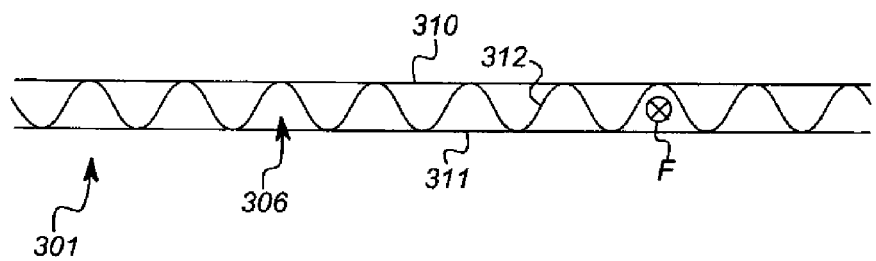
FIG. 3B is a cross-section along the line 3B-3B in FIG. 3A.

Referring back to FIG. 3B, the direction F of extension of flutes 306 is the direction in which a ray extended in direction F will not cross fluted sheet 312, even if extended to the edge of box blank 301. In conventional corrugated board, such as that shown here, the opposite to direction F can also be considered the direction of extension of flutes 306, since either direction F or its opposite can be extended to the edges of box blank 301 without crossing fluted sheet 312. In conventional corrugated board, each flute 306 (each cycle formed in fluted sheet 312) has a direction of extension substantially equal to that of each other flute 306.

In the following description, some embodiments will be described in terms that would ordinarily be implemented as software programs. Those skilled in the art will readily recognize that the equivalent of such software can also be constructed in hardware. Because image manipulation algorithms and systems are well known, the present description will be directed in particular to algorithms and systems forming part of, or cooperating more directly with, methods described herein. Other aspects of such algorithms and systems, and hardware or software for producing and otherwise processing the image signals involved therewith, not specifically shown or described herein, are selected from such systems, algorithms, components, and elements known in the art. Given the system as described herein, software not specifically shown, suggested, or described herein that is useful for implementation of various embodiments is conventional and within the ordinary skill in such arts.

A computer program product can include one or more storage media, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice methods according to various embodiments.

The electrophotographic (EP) printing process can be embodied in devices including printers, copiers, scanners, and facsimiles, and analog or digital devices, all of which are referred to herein as "printers." Electrostatographic printers such as electrophotographic printers that employ toner developed on an electrophotographic receiver can be used, as can ionographic printers and copiers that do not rely upon an electrophotographic receiver. Electrophotography and ionography are types of electrostatography (printing using electrostatic fields), which is a subset of electrography (printing using electric fields).

As used herein, "toner particles" are particles of one or more material(s) that are transferred by an EP printer to a receiver to produce a desired effect or structure (e.g., a print image, texture, pattern, or coating) on the receiver. Toner particles can be ground from larger solids, or chemically prepared (e.g., precipitated from a solution of a pigment and a dispersant using an organic solvent), as is known in the art. Toner particles can have a range of diameters, e.g., less than 8 µm, on the order of 10-15 µm, up to approximately 30 µm, or larger ("diameter" refers to the volume-weighted median diameter, as determined by a device such as a Coulter Multisizer).

"Toner" refers to a material or mixture that contains toner particles, and that can form an image, pattern, or coating when deposited on an imaging member including a photoreceptor, a photoconductor, or an electrostatically-charged or magnetic surface. Toner can be transferred from the imaging member to a receiver. Toner is also referred to in the art as marking particles, dry ink, or developer, but note that herein "developer" is used differently, as described below. Toner can be a dry mixture of particles or a suspension of particles in a liquid toner base. Toner or toner particles can include ceramics or ceramic pigments. Toner particles can have a Young's modulus between 2.5 GPa and 3.5 GPa in the glassy state.

Toner includes toner particles and can include other particles. Any of the particles in toner can be of various types and have various properties. Such properties can include absorption of incident electromagnetic radiation (e.g., particles containing colorants such as dyes or pigments), absorption of moisture or gasses (e.g., desiccants or getters), suppression of bacterial growth (e.g., biocides, particularly useful in liquid-toner systems), adhesion to the receiver (e.g., binders), electrical conductivity or low magnetic reluctance (e.g., metal particles), electrical resistivity, texture, gloss, magnetic remnance, florescence, resistance to etchants, and other properties of additives known in the art.

In various embodiments, large-particle toners or large-particle clear toners ("DMCL") are used. Examples are described in commonly-assigned U.S. Patent Publication No. 2008/0159786 by Tombs et al., the disclosure of which is incorporated herein by reference.

A digital reproduction printing system ("printer") typically includes a digital front-end processor (DFE), a print engine (also referred to in the art as a "marking engine") for applying toner to the receiver, and one or more post-printing finishing system(s) (e.g. a UV coating system, a glosser system, or a laminator system). A printer can reproduce pleasing black-and-white or color onto a receiver. A printer can also produce selected patterns of toner on a receiver, which patterns (e.g. surface textures) do not correspond directly to a visible image. The DFE receives input electronic files (such as Postscript command files) composed of images from other input devices (e.g., a scanner, a digital camera). The DFE include various function processors, e.g. a raster image processor (RIP), image positioning processor, image manipulation processor, color processor, or image storage processor. The DFE rasterizes input electronic files into image bitmaps for the print engine to print. In some embodiments, the DFE permits a human operator to set up parameters such as layout, font, color, media type, or post-finishing options. The print engine takes the rasterized image bitmap from the DFE and renders the bitmap into a form that can control the printing process from the exposure device to transferring the print image onto the receiver. The finishing system applies features such as protection, glossing, or binding to the prints. The finishing system can be implemented as an integral component of a printer, or as a separate machine through which prints are fed after they are printed.

The printer can also include a color management system which captures the characteristics of the image printing process implemented in the print engine (e.g. the electrophotographic process) to provide known, consistent color reproduction characteristics. The color management system can also provide known color reproduction for different inputs (e.g. digital camera images or film images).

In an embodiment of an electrophotographic modular printing machine, e.g. the NEXPRESS 3000SE printer manufactured by Eastman Kodak Company of Rochester, N.Y., color-toner print images are made in a plurality of color imaging modules arranged in tandem, and the print images are successively electrostatically transferred to a receiver adhered to a transport web moving through the modules. Colored toners include colorants, e.g. dyes or pigments, which absorb specific wavelengths of visible light. Commercial machines of this type typically employ intermediate transfer members in the respective modules for transferring visible images from the photoreceptor and transferring print images to the receiver. In other electrophotographic printers, each visible image is directly transferred to a receiver to form the corresponding print image.

Electrophotographic printers having the capability to also deposit clear toner using an additional imaging module are also known. As used herein, clear toner is considered to be a color of toner, as are C, M, Y, K, and Lk, but the term "colored toner" excludes clear toners. The provision of a clear-toner overcoat to a color print is desirable for providing protection of the print from fingerprints and reducing certain visual artifacts. Clear toner uses particles that are similar to the toner particles of the color development stations but without colored material (e.g. dye or pigment) incorporated into the toner particles. However, a clear-toner overcoat can add cost and reduce color gamut of the print; thus, it is desirable to provide for operator/user selection to determine whether or not a clear-toner overcoat will be applied to the entire print. A uniform layer of clear toner can be provided. A layer that varies inversely according to heights of the toner stacks can also be used to establish level toner stack heights. The respective toners are deposited one upon the other at respective locations on the receiver and the height of a respective toner stack is the sum of the toner heights of each respective color. Uniform stack height provides the print with a more even or uniform gloss.

Figure 1:
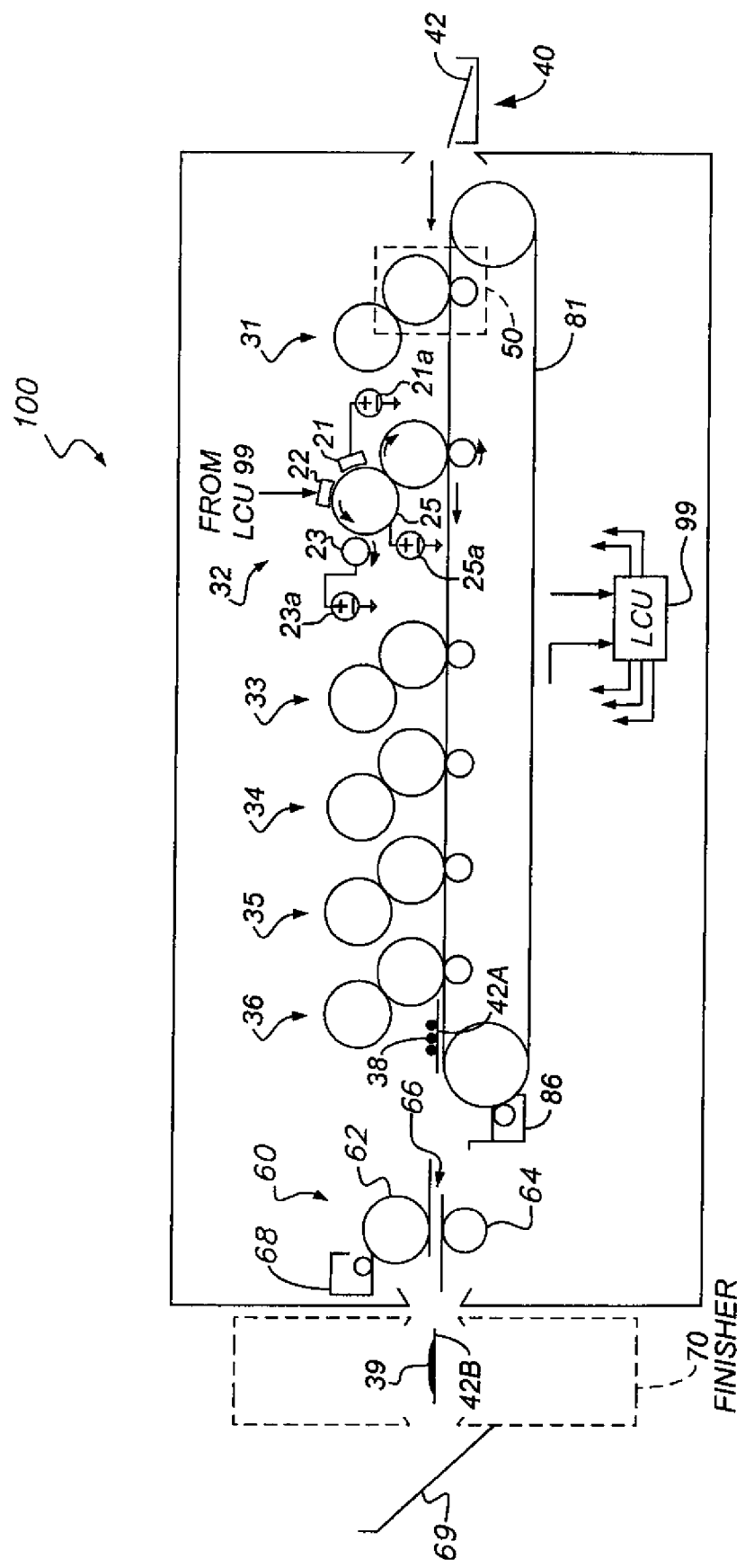
FIG. 1 is an elevational cross-section of an electrophotographic reproduction apparatus.

FIG. 1 is an elevational cross-section showing portions of a typical electrophotographic printer 100. Printer 100 is adapted to produce print images, such as single-color (monochrome), CMYK, or hexachrome (six-color) images, on a receiver (multicolor images are also known as "multi-component" images). Images can include text, graphics, photos, and other types of visual content. An embodiment involves printing using an electrophotographic print engine having six sets of single-color image-producing or -printing stations or modules arranged in tandem, but more or fewer than six colors can be combined to form a print image on a given receiver. Other electrophotographic writers or printer apparatus can also be included. Various components of printer 100 are shown as rollers; other configurations are also possible, including belts.

Referring to FIG. 1, printer 100 is an electrophotographic printing apparatus having a number of tandemly-arranged electrophotographic image-forming printing modules 31, 32, 33, 34, 35, 36, also known as electrophotographic imaging subsystems. Each printing module 31, 32, 33, 34, 35, 36 produces a single-color toner image for transfer using a respective transfer subsystem 50 (for clarity, only one is labeled) to a receiver 42 successively moved through the modules. Receiver 42 is transported from supply unit 40, which can include active feeding subsystems as known in the art, into printer 100. In various embodiments, the visible image can be transferred directly from an imaging roller to a receiver 42, or from an imaging roller to one or more transfer roller(s) or belt(s) in sequence in transfer subsystem 50, and thence to receiver 42. Receiver 42 is, for example, a selected section of a web of, or a cut sheet of, planar media such as paper or transparency film.

Each printing module 31, 32, 33, 34, 35, 36 includes various components. For clarity, these are only shown in printing module 32. Around photoreceptor 25 are arranged, ordered by the direction of rotation of photoreceptor 25, charger 21, exposure subsystem 22, and toning station 23.

In the EP process, an electrostatic latent image is formed on photoreceptor 25 by uniformly charging photoreceptor 25 and then discharging selected areas of the uniform charge to yield an electrostatic charge pattern corresponding to the desired image (a "latent image"). Charger 21 produces a uniform electrostatic charge on photoreceptor 25 or its surface. Exposure subsystem 22 selectively image-wise discharges photoreceptor 25 to produce a latent image. Exposure subsystem 22 can include a laser and raster optical scanner (ROS), one or more LEDs, or a linear LED array.

After the latent image is formed, charged toner particles are brought into the vicinity of photoreceptor 25 by toning station 23 and are attracted to the latent image to develop the latent image into a visible image. Note that the visible image may not be visible to the naked eye depending on the composition of the toner particles (e.g. clear toner). Toning station 23 can also be referred to as a development station. Toner can be applied to either the charged or discharged parts of the latent image.

After the latent image is developed into a visible image on photoreceptor 25, a suitable receiver 42 is brought into juxtaposition with the visible image. In transfer subsystem 50, a suitable electric field is applied to transfer the toner particles of the visible image to receiver 42 to form the desired print image 38 on the receiver, as shown on receiver 42A. The imaging process is typically repeated many times with reusable photoreceptors 25.

Receiver 42A is then removed from its operative association with photoreceptor 25 and subjected to heat or pressure to permanently fix ("fuse") print image 38 to receiver 42A. Plural print images, e.g. of separations of different colors, are overlaid on one receiver before fusing to form a multi-color print image 38 on receiver 42A.

Each receiver 42, during a single pass through the six printing modules 31, 32, 33, 34, 35, 36, can have transferred in registration thereto up to six single-color toner images to form a pentachrome image. As used herein, the term "hexachrome" implies that in a print image, combinations of various of the six colors are combined to form other colors on receiver 42 at various locations on receiver 42. That is, each of the six colors of toner can be combined with toner of one or more of the other colors at a particular location on receiver 42 to form a color different than the colors of the toners combined at that location. In an embodiment, printing module 31 forms black (K) print images, 32 forms yellow (Y) print images, 33 forms magenta (M) print images, 34 forms cyan (C) print images, 35 forms light-black (Lk) images, and 36 forms clear images.

In various embodiments, printing module 36 forms print image 38 using a clear toner or tinted toner. Tinted toners absorb less light than they transmit, but do contain pigments or dyes that move the hue of light passing through them towards the hue of the tint. For example, a blue-tinted toner coated on white paper will cause the white paper to appear light blue when viewed under white light, and will cause yellows printed under the blue-tinted toner to appear slightly greenish under white light.

Receiver 42A is shown after passing through printing module 36. Print image 38 on receiver 42A includes unfused toner particles.

Subsequent to transfer of the respective print images 38, overlaid in registration, one from each of the respective printing modules 31, 32, 33, 34, 35, 36, receiver 42A is advanced to fixing device 60, i.e. a fusing or fixing assembly, to fuse print image 38 to receiver 42A. Transport web 81 transports the print-image-carrying receivers (e.g., 42A) to fixing device 60, which fixes the toner particles to the respective receivers 42A by the application of heat and pressure. The receivers 42A are serially de-tacked from transport web 81 to permit them to feed cleanly into fixing device 60. Transport web 81 is then reconditioned for reuse at cleaning station 86 by cleaning and neutralizing the charges on the opposed surfaces of the transport web 81. A mechanical cleaning station (not shown) for scraping or vacuuming toner off transport web 81 can also be used independently or with cleaning station 86. The mechanical cleaning station can be disposed along transport web 81 before or after cleaning station 86 in the direction of rotation of transport web 81.

Fixing device 60 includes a heated fusing roller 62 and an opposing pressure roller 64 that form a fusing nip 66 therebetween. In an embodiment, fixing device 60 also includes a release fluid application substation 68 that applies release fluid, e.g. silicone oil, to fusing roller 62. Alternatively, wax-containing toner can be used without applying release fluid to fusing roller 62. Other embodiments of fusers, both contact and non-contact, can be employed. For example, solvent fixing uses solvents to soften the toner particles so they bond with the receiver 42. Photoflash fusing uses short bursts of high-frequency electromagnetic radiation (e.g. ultraviolet light) to melt the toner. Radiant fixing uses lower-frequency electromagnetic radiation (e.g. infrared light) to more slowly melt the toner. Microwave fixing uses electromagnetic radiation in the microwave range to heat the receivers (primarily), thereby causing the toner particles to melt by heat conduction, so that the toner is fixed to the receiver 42.

The receivers (e.g., receiver 42B) carrying the fused image (e.g., fused image 39) are transported in a series from fixing device 60 along a path either to a remote output tray 69, or back to printing modules 31, 32, 33, 34, 35, 36 to create an image on the backside of the receiver (e.g., receiver 42B), i.e. to form a duplex print. Receivers (e.g., receiver 4213) can also be transported to any suitable output accessory. For example, an auxiliary fuser or glossing assembly can provide a clear-toner overcoat. Printer 100 can also include multiple fixing devices 60 to support applications such as overprinting, as known in the art.

In various embodiments, between fixing device 60 and output tray 69, receiver 42B passes through finisher 70. Finisher 70 performs various media-handling operations, such as folding, stapling, saddle-stitching, collating, and binding.

Printer 100 includes main printer apparatus logic and control unit (LCU) 99, which receives input signals from the various sensors associated with printer 100 and sends control signals to the components of printer 100. LCU 99 can include a microprocessor incorporating suitable look-up tables and control software executable by the LCU 99. It can also include a field-programmable gate array (FPGA), programmable logic device (PLD), microcontroller, or other digital control system. LCU 99 can include memory for storing control software and data. Sensors associated with the fusing assembly provide appropriate signals to the LCU 99. In response to the sensors, the LCU 99 issues command and control signals that adjust the heat or pressure within fusing nip 66 and other operating parameters of fixing device 60 for receivers. This permits printer 100 to print on receivers of various thicknesses and surface finishes, such as glossy or matte.

Image data for writing by printer 100 can be processed by a raster image processor (RIP; not shown), which can include a color separation screen generator or generators. The output of the RIP can be stored in frame or line buffers for transmission of the color separation print data to each of respective LED writers, e.g. for black (K), yellow (Y), magenta (M), cyan (C), and red (R), respectively. The RIP or color separation screen generator can be a part of printer 100 or remote therefrom. Image data processed by the RIP can be obtained from a color document scanner or a digital camera or produced by a computer or from a memory or network which typically includes image data representing a continuous image that needs to be reprocessed into halftone image data in order to be adequately represented by the printer. The RIP can perform image processing processes, e.g. color correction, in order to obtain the desired color print. Color image data is separated into the respective colors and converted by the RIP to halftone dot image data in the respective color using matrices, which comprise desired screen angles (measured counterclockwise from rightward, the +X direction) and screen rulings. The RIP can be a suitably-programmed computer or logic device and is adapted to employ stored or computed matrices and templates for processing separated color image data into rendered image data in the form of halftone information suitable for printing. These matrices can include a screen pattern memory (SPM).

Various parameters of the components of a printing module (e.g., printing module 31) can be selected to control the operation of printer 100. In an embodiment, charger 21 is a corona charger including a grid between the corona wires (not shown) and photoreceptor 25. Voltage source 21a applies a voltage to the grid to control charging of photoreceptor 25. In an embodiment, a voltage bias is applied to toning station 23 by voltage source 23a to control the electric field, and thus the rate of toner transfer, from toning station 23 to photoreceptor 25. In an embodiment, a voltage is applied to a conductive base layer of photoreceptor 25 by voltage source 25a before development, that is, before toner is applied to photoreceptor 25 by toning station 23. The applied voltage can be zero; the base layer can be grounded. This also provides control over the rate of toner deposition during development. In an embodiment, the exposure applied by exposure subsystem 22 to photoreceptor 25 is controlled by LCU 99 to produce a latent image corresponding to the desired print image. All of these parameters can be changed, as described below.

Further details regarding printer 100 are provided in U.S. Pat. No. 6,608,641, issued on Aug. 19, 2003, to Peter S. Alexandrovich et al., and in U.S. Publication No. 2006/0133870, published on Jun. 22, 2006, by Yee S. Ng et al., the disclosures of which are incorporated herein by reference.

Figure 2:
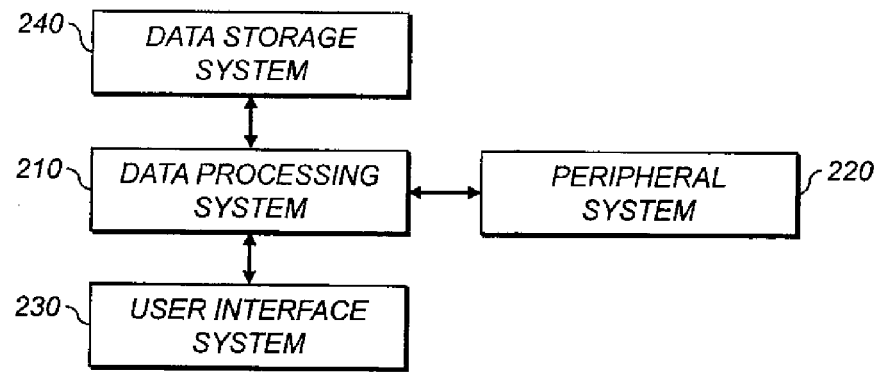
FIG. 2 is a high-level diagram showing the components of a processing system useful with various embodiments.

FIG. 2 is a high-level diagram showing the components of a processing system useful with various embodiments. The system includes a data processing system 210, a peripheral system 220, a user interface system 230, and a data storage system 240. Peripheral system 220, user interface system 230 and data storage system 240 are communicatively connected to data processing system 210.

Data processing system 210 includes one or more data processing devices that implement the processes of various embodiments, including the example processes described herein. The phrases "data processing device" or "data processor" are intended to include any data processing device, such as a central processing unit ("CPU"), a desktop computer, a laptop computer, a mainframe computer, a personal digital assistant, a Blackberry™, a digital camera, cellular phone, or any other device for processing data, managing data, or handling data, whether implemented with electrical, magnetic, optical, biological components, or otherwise.

Data storage system 240 includes one or more processor-accessible memories configured to store information, including the information needed to execute the processes of the various embodiments, including the example processes described herein. Data storage system 240 can be a distributed processor-accessible memory system including multiple processor-accessible memories communicatively connected to data processing system 210 via a plurality of computers or devices. On the other hand, data storage system 240 need not be a distributed processor-accessible memory system and, consequently, can include one or more processor-accessible memories located within a single data processor or device.

The phrase "processor-accessible memory" is intended to include any processor-accessible data storage device, whether volatile or nonvolatile, electronic, magnetic, optical, or otherwise, including but not limited to, registers, floppy disks, hard disks, Compact Discs, DVDs, flash memories, ROMs, and RAMs.

The phrase "communicatively connected" is intended to include any type of connection, whether wired or wireless, between devices, data processors, or programs in which data can be communicated. The phrase "communicatively connected" is intended to include a connection between devices or programs within a single data processor, a connection between devices or programs located in different data processors, and a connection between devices not located in data processors at all. In this regard, although the data storage system 240 is shown separately from data processing system 210, one skilled in the art will appreciate that data storage system 240 can be stored completely or partially within data processing system 210. Further in this regard, although peripheral system 220 and user interface system 230 are shown separately from data processing system 210, one skilled in the art will appreciate that one or both of such systems can be stored completely or partially within data processing system 210.

Peripheral system 220 can include one or more devices configured to provide digital content records to data processing system 210. For example, peripheral system 220 can include digital still cameras, digital video cameras, cellular phones, or other data processors. Data processing system 210, upon receipt of digital content records from a device in peripheral system 220, can store such digital content records in data storage system 240. Peripheral system 220 can also include a printer interface for causing a printer to produce output corresponding to digital content records stored in data storage system 240 or produced by data processing system 210.

User interface system 230 can include a mouse, a keyboard, another computer, or any device or combination of devices from which data is input to data processing system 210. In this regard, although peripheral system 220 is shown separately from user interface system 230, peripheral system 220 can be included as part of user interface system 230.

User interface system 230 also can include a display device, a processor-accessible memory, or any device or combination of devices to which data is output by data processing system 210. In this regard, if user interface system 230 includes a processor-accessible memory, such memory can be part of data storage system 240 even though user interface system 230 and data storage system 240 are shown separately in FIG. 1.

o o o

Figure 4:
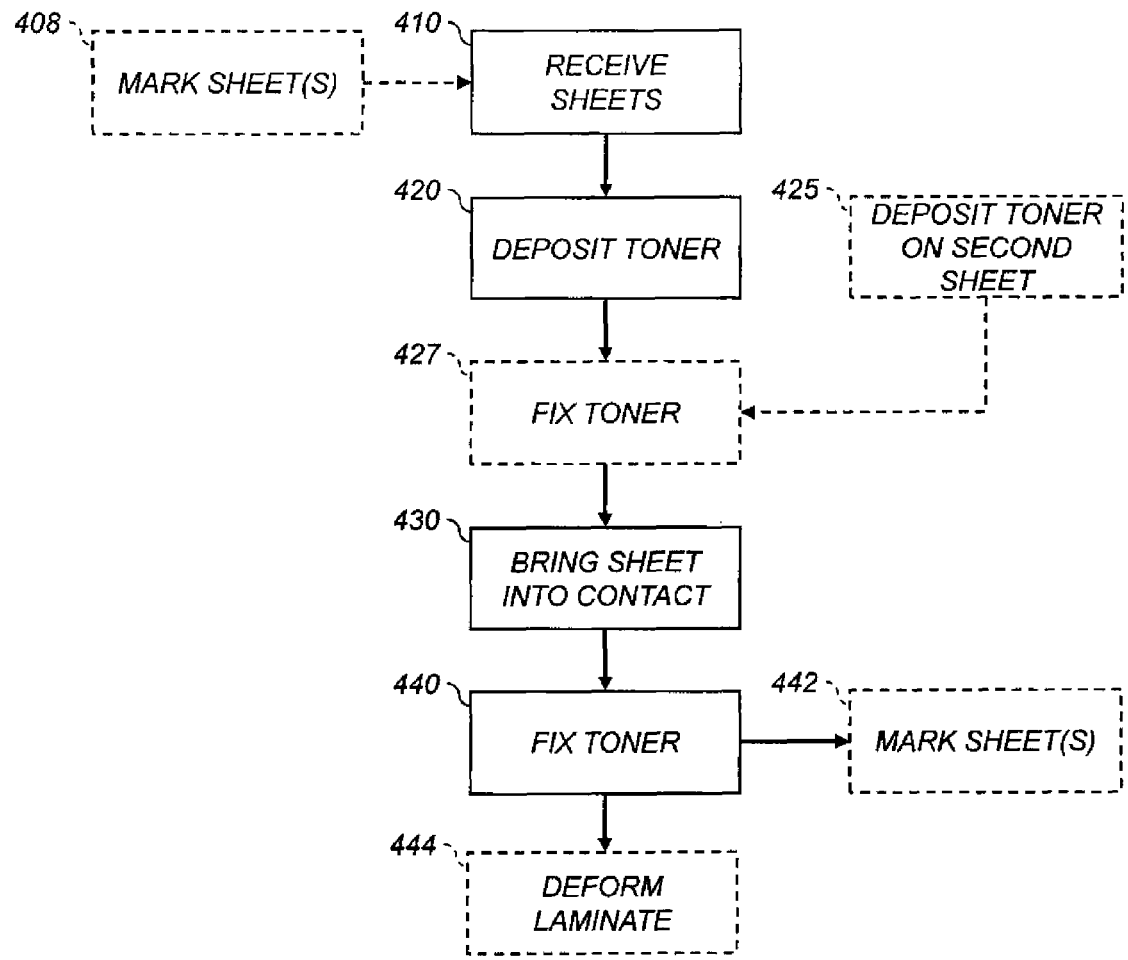
FIG. 4 shows methods of forming a structural laminate according to various embodiments.

FIG. 4 shows methods of forming a structural laminate according to various embodiments. Processing begins with step 410, or optional step 408.

In optional step 408, in various embodiments, the first or second sheets are marked, e.g., by toner printing. Graphical, textual, or photographic markings, e.g., registration marks and product information, can be printed or otherwise provided on the sheets. The received first sheet or the received second sheet thus carries markings, e.g., graphical information or registration marks. Step 408 is followed by step 410.

In step 410, first and second sheets are received. The sheets can be paper or another material. Bond paper with a thickness of 4 mil (100 μm) can be used. Other suitable media include wood veneers, polymers, metal foils, and thin ceramic sheets.

In step 420, a selected volume of toner particles (the selected volume is not of toner particles plus air) is deposited on the first sheet to form a deposited toner pattern patterned after an aim toner pattern. Toner particles with a mean diameter of 12 μm can be used, or >=20 μm, or >=25 μm. The deposited toner pattern is disposed over a selected first surface area of the first sheet less than the full surface area of the first sheet. The deposited toner pattern extends normal to the first sheet by a selected first height. Multiple areas of toner, adjoined or separate, can also be deposited. Step 420 is followed by step 430, or optional step 427.

In step 425, in various embodiments, before bringing-into-contact step 430, a second selected volume of toner particles is deposited on the second sheet. This toner forms a second toner pattern patterned after a second aim. The second toner pattern is disposed over a selected second surface area of the second sheet and extends normal to the second sheet by a selected second height. In various embodiments, the second toner pattern aligns with the first toner pattern, either overlapping or adjacent. Step 425 is followed by step 427.

In optional step 427, the toner on one or both sheets is fixed before the bringing-into-contact step. Fixing can be performed as described with reference to step 440. Step 427 is followed by step 430.

In step 430, the second sheet, or toner thereon, is brought into contact with the deposited toner pattern on the first sheet. The sheets can be brought together by pinch rollers, a nip, a press, or other devices. The sheets can be brought together front-to-back, back-to-front, front-to-front, or back-to-back. The sheets can be brought together fully overlapping (e.g., for a book cover) or offset (e.g., for a beam or plank with staggered sheets). In various embodiments using toner on both sheets, the second deposited toner pattern is deposited on a front face of the second sheet in step 425. A back face of the second sheet is brought into contact with the first deposited toner pattern on the first sheet in step 430. Step 430 is followed by step 440.

In step 440, the structural laminate is formed by fixing the deposited toner pattern to produce a fixed toner pattern that adheres the second sheet to the first sheet. The volume of toner after fixing is substantially equal to the selected volume. Although air is pressed out of or otherwise departs the toner during fixing, the actual volume of toner particles is substantially equal before and after fixing. The fixed toner pattern is disposed over a second surface area of the first sheet greater than the selected first surface area. This is because the toner generally spreads during fixing. The fixed toner pattern extends normal to the first sheet by a nonzero second height less than the first height. This is also due to the spreading during fixing. After fixing, there is a controlled separation between the sheets. The separation is determined by the thickness and lateral extent of the unfixed toner and the uniformity and shape of the toner pattern.

In various embodiments, the fixed toner pattern includes three non-contiguous regions of fixed toner that define a cell including the three regions and the portions of the first and second sheets connecting the three cells.

In various embodiments, the structural laminate has a bending moment (or more than one moment, each in a different direction) in a structural area including at least some of the second surface area. The moment in the structural area is higher than the bending moment of either the first or the second sheet in the structural area. This is discussed below with reference to FIG. 26.

In other embodiments, the structural laminate has a tensile strength in a selected stress direction (or more than one, each in a different direction) in a structural area including at least some of the second surface area that is higher than the tensile strength in the selected stress direction of either the first or the second sheet in the structural area. This is also discussed below with reference to FIG. 26.

In various embodiments, step 440 includes softening the toner particles so that the softened toner particles bond to the first sheet and to the second sheet and further bond to each other. The softened toner particles form a fused toner mass separating the sheets by a second distance that is less than the first distance, and the volume of toner (not including air between unfixed toner particles) remains substantially unchanged. The first sheet, the second sheet, the first toner pattern and the softening are controlled to create a toner-bonded structure that has a predetermined bending moment.

In various embodiments, after fixing step 440, 5%-35%, or 10%-25%, of each of the respective surface areas of the first and second sheets are covered with toner. This structure, with toner bonds between the sheets over only some of the area of the sheets, provides strength with reduced weight compared to a solid toner fill over the full surface area of each sheet.

In various embodiments, the toner is or includes a thermoplastic. In various embodiments, the toner is or includes a thermoset toner that thermosets into a glassy phase in which it has a Young's modulus of more than 1 GPa. In these embodiments, fixing step 440 includes curing the thermoset toner on the first sheet, e.g., by radiation exposure or chemical treatment. In various embodiments, the toner has a surface energy of between about 35 ergs/cm$^2$ and about 45 ergs/cm$^2$. The lower limit imparts strength to the bond between toner and media. The upper limit causes water to shed, providing increased strength to the laminate and reducing the probability of the laminate's holding water and weakening the sheets.

After fixing, the toner is activated to transition it from a thermoplastic to a thermoset. Transitioning to a thermoset makes the toner more resistant to thermal or chemical softening and more resistant to degradation.

In various embodiments using toner on both sheets, the toner on the second sheet is fixed in this step after bringing-into-contact step 430. In these embodiments, the toner on the first sheet is fixed in step 427 before the bringing-into-contact step.

In various embodiments using toner on both sheets, the toner on the first and second sheets is unfixed during bringing-into-contact step 430. Unfixed toner is a mass of separable toner particles, at least some of which have asperities. An asperity is a localized bump on a toner particle and prevents the toner particles from coming into intimate contact with each other. Asperities are present on surfaces that are not atomically smooth. Fixing step 440 includes fixing the toner on the first and second sheets simultaneously or sequentially. Fixing can be performed various ways, as described herein. In various embodiments that heat the toner during fixing, the Young's modulus of the toner changes from about 3 GPa (glassy) to about 3 MPa (rubbery). Pressure then causes the toner to flow, pressing the toner particles together and substantially reducing asperities in the resulting coalesced and cohered mass of toner.

In various embodiments using toner on both sheets, the second deposited (or aim) toner pattern corresponds to the first deposited (or aim) toner pattern. The first and second sheets are brought into contact (step 430) so that the deposited first and second toner patterns are in register. That is, corresponding features of the two deposited toner patterns align. As a result, after fixing step 440, the first and second sheets are separated by more than the second height.

In various embodiments, fixing step 440 includes applying a fixing agent, e.g., a fixing chemical or solvent, to the toner on the first sheet. Solvent fixing is useful for thermally-sensitive packages. Solvent fixing does not require a high temperature, and the toner does not release a latent heat of fusion. (Latent heat occurs with a 1$^{st}$ order phase transition, as determined by the Clausius-Clapeyron relationship. This is because the Gibbs free energies of the two phases are the same but their first derivatives are not. A glass transition is not a phase transition. Rather, it is a rapid change in Young's modulus without two distinct thermodynamic phases. Hence, no latent heat is released during a glass transition.) Fixing step 440 can be performed by devices attached to or separate from the printer. Two printers can be used to print toner on each sheet, or a printer and a feeder to print toner on the first sheet and supply the second sheet, and the resulting sheets fed into a separate fixing device to fix them together. Step 440 can be followed by step 442 or step 444.

In optional step 442, in various embodiments, markings are printed on the first or the second sheet(s) after fixing step 440. This permits using high fusing temperatures or long fusing times that might cause hot offset of pre-printed toner.

In optional step 444, while the toner is still warm and malleable as it exits the fixer, the laminate is mechanically deformed and retained in a deformed shape until the toner cools below its glass transition temperature $T_g$. This provides a shape to the finished laminate without accumulated internal stresses. In an example, the sheets are rolled around a drum rotating on an axis oriented in the cross-track direction as the sheets exit the fixer to form curved shapes or columns. In another example, the sheets are passed through a form (optionally a heated form) or pressed in a form to take on a desired shape. Sheets passed through a form can be deformed around their direction of movement. For example, the sheets can be rolled around an axis parallel to their direction of movement to form a tube that is extruded continuously. Step 444 can be performed by devices attached to the printer, or devices separate from the printer.

Figure 11:
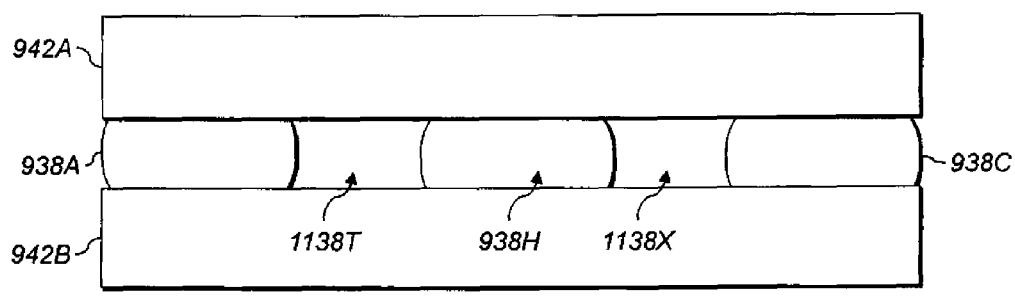
FIG. 11 is an exemplary elevational section of a laminate according to various embodiments.

FIG. 11 is an elevational section of a laminate, e.g., produced by a method shown in FIG. 4. Sheets 942A, 942B are bond paper. They are 4.5pt (0.0045"≈113 µm) thick, and mass 90 g/m$^2$. Fixed toner bumps 938A, 938H, 938C are coated to a mass of 10 g/m$^2$ on the sheets. Air gaps (non-toner-containing spaces) 1138T, 1138X separate toner bumps 938A, 938H, 938C. In other embodiments, the toner is coated to a mass of 4 g/m$^2$. Toner bumps 938A, 938H, 938C hold sheets 942A, 942B together. The spacing between sheets 942A and 942B is controlled by varying the amount of toner deposited, and the number of fixing steps and their temporal arrangement with respect to toner-deposition steps.

Figure 12A:
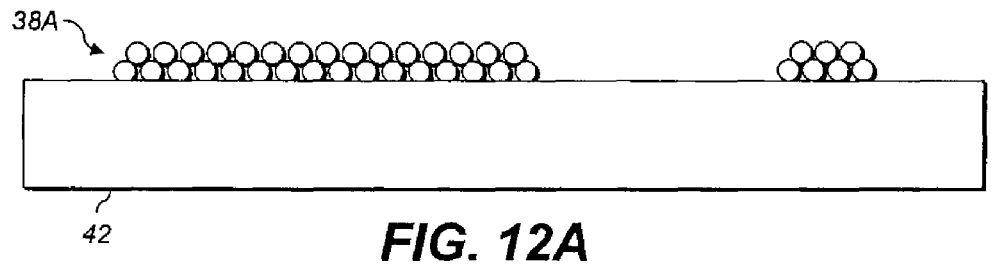
FIGS. 12A-12D show examples of depositing and fixing toner to build thicker toner stacks according to various embodiments.
Figure 12B:
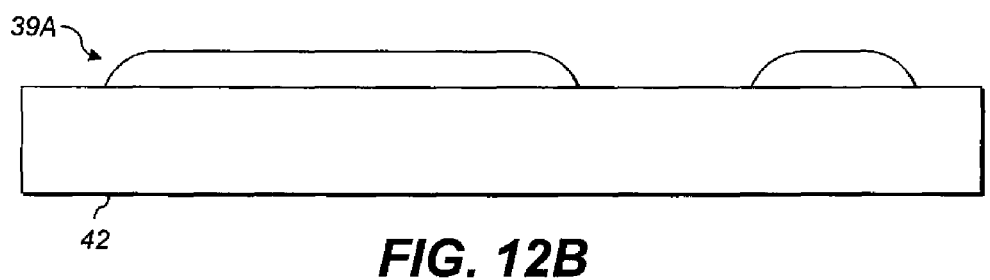
Figure 12C:
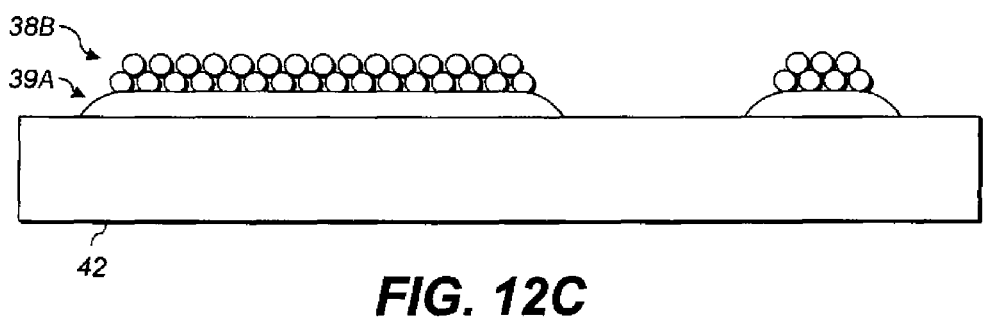
Figure 12D:
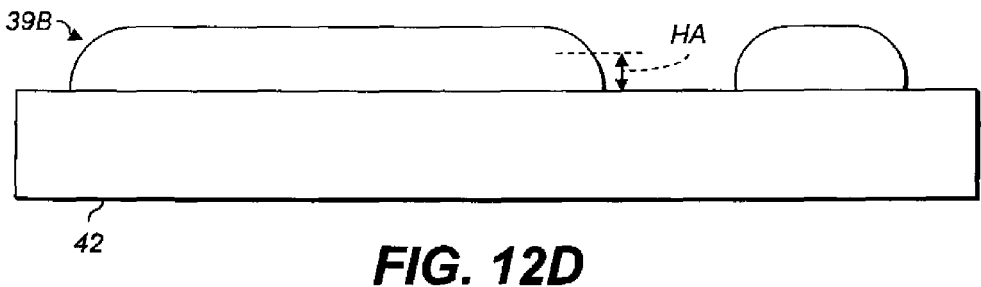

For example, FIGS. 12A-12D show examples of depositing and fixing toner to build thicker toner stacks. FIG. 12A shows unfixed toner 38A on receiver 42. FIG. 12B shows the same after fixing: fixed toner 39A is a coherent mass on receiver 42, e.g., a cut sheet. FIG. 12C shows additional unfixed toner 38B deposited on fixed toner 39A on receiver 42. FIG. 12D shows fixed toner 39B, which includes fixed toner 39A and unfixed toner 38B, on receiver 42. Fixings steps can reduce the thickness of toner piles, but each additional toner layer does add net thickness. For comparison, the height of fixed toner 39A (FIG. 12B) is shown as height HA. Fixed toner 39B is taller than height HA.

In various embodiments, large-diameter toner particles (e.g., DMCL) are used to build thickness, and small-diameter toner particles are used to provide fine control of the thickness to maintain sheets 942A, 942B (FIG. 11) substantially parallel. In other embodiments, only large toner, or only small toner, is used. The size and amount of toner to be used is selected to provide a desired stiffness to the laminate at a desired weight.

The pattern of toner is selected to provide or improve desired mechanical properties. For example, the fixed toner in the pattern can improve bending moment or tensile strength. Tensile strength can be controlled separately from bending moment by varying the pattern, as discussed herein with reference to FIGS. 5-7.

Figure 5:
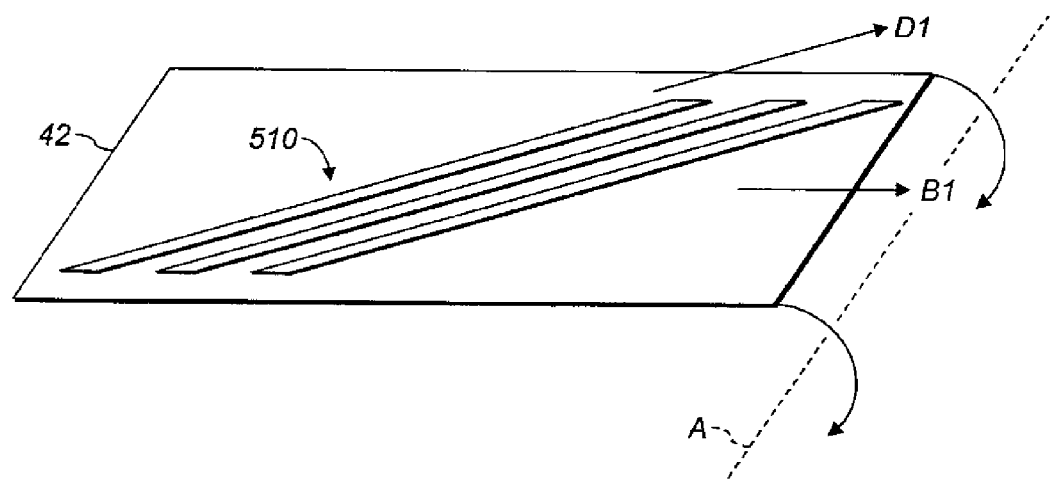
FIGS. 5 and 6 are perspectives of examples of toner patterns according to various embodiments.

FIG. 5 is a perspective of examples of toner patterns according to various embodiments. Bend direction B1 of receiver 42 is shown by the curved arrows. By definition, bend direction B1 is normal to bend axis A around which the bending is occurring. Receiver 42 can be the first sheet or second sheet.

In various embodiments, the deposited toner pattern (on the first or second sheet) includes one or more first contiguous regions 510 of toner extending in a selected first pattern direction D1 within between about 30° and about 60° of bend direction B1. The contiguous regions increase the bending moment in the selected first bend direction B1. In various embodiments, the laminate in the footprint of one of the contiguous regions of toner has a lower strain than the sheets together for a given applied stress, and laminate in the footprint of another of the contiguous regions of toner has a higher yield strength than the two sheets together. The "footprint" of a region is the portion of the laminate (sheets and toner) in which the normal to any sheet passes through the region. This design characteristic can also be used in other embodiments described below, such as those using second contiguous regions of toner and those using 45° patterns.

Figure 6:
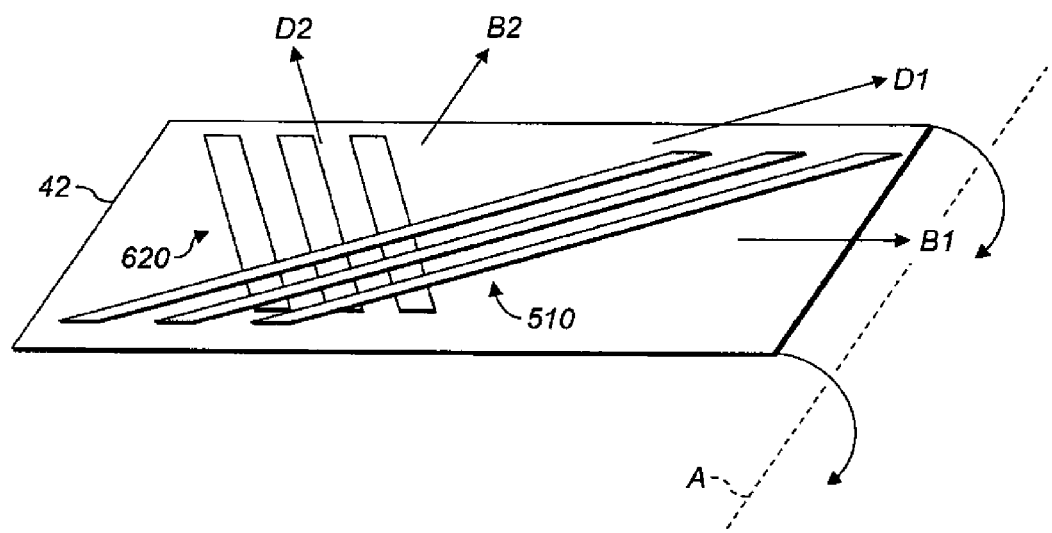

FIG. 6 is a perspective of examples of toner patterns according to various embodiments. Bend direction B1, axis A, regions 510, and pattern direction D1 are as shown in FIG. 5. Bend direction B2 is different from bend direction B1.

The deposited toner pattern further includes one or more second contiguous regions of toner 620 extending in selected second pattern direction D2 within between about 30° and about 60° of selected second bend direction B2, which is normal to a second bend radius. Second contiguous regions 620 increase the bending moment in selected second bend direction B2.

Figure 7:
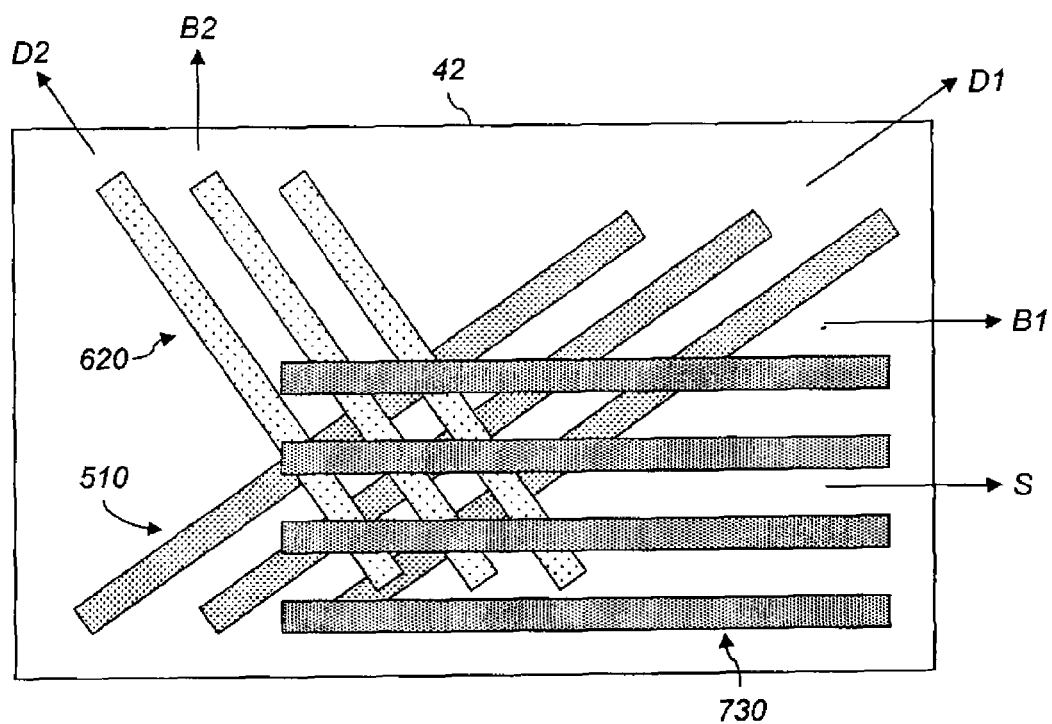
FIG. 7 is a plan of examples of toner patterns according to various embodiments.

FIG. 7 is a plan of examples of toner patterns according to various embodiments. Bend directions B1, B2, regions 510, 620, and pattern directions D1, D2 are as shown in FIG. 6. Stress direction S is the direction of an applied tensile stress. The deposited toner pattern further includes one or more contiguous regions 730 of toner extending in a selected second pattern direction within about 45° of stress direction S. Regions 730 provide a two-sheet structural laminate with a tensile strength in direction S in the structural area higher than the tensile strength in selected second stress direction S of either sheet in the structural area. Receiver 42 can have different tensile strengths in different directions. Diagonal patterns, e.g., with regions 510 and 620, stiffen receiver 42 against bending, and increase the tensile strength in directions D1 and D2, even if not in direction S. In-line pattern with regions 730 increases tensile strength. The number and shape of regions are selected to provide desired mechanical properties.

The coalesced, fixed toner mass adds stiffness to the laminate. Thus, depositing toner in a particular pattern can impart stiffness or strength in a particular direction and retain flexibility or fracturability in another direction. In various examples in which the laminate is in the X-Y plane, a stress applied in a specific direction, for example the vertical or Z-direction (i.e., normal to the laminate), can have components along only the Z-direction (a longitudinal stress) or also along the X- or Y-directions of the laminate (a shear or transverse stress). Since the direction of the application of the stress and the direction of propagation of the stress are separately specified, stress is mathematically characterized as a second order tensor. Similarly, the deformation of the material in response to the applied stress, known as the strain, can occur in the direction that is parallel or perpendicular to the stress and therefore is characterized mathematically as a second order tensor. The elastic stiffness, which is the proportionality between the applied stress and the strain, is a fourth order tensor.

Figure 8:
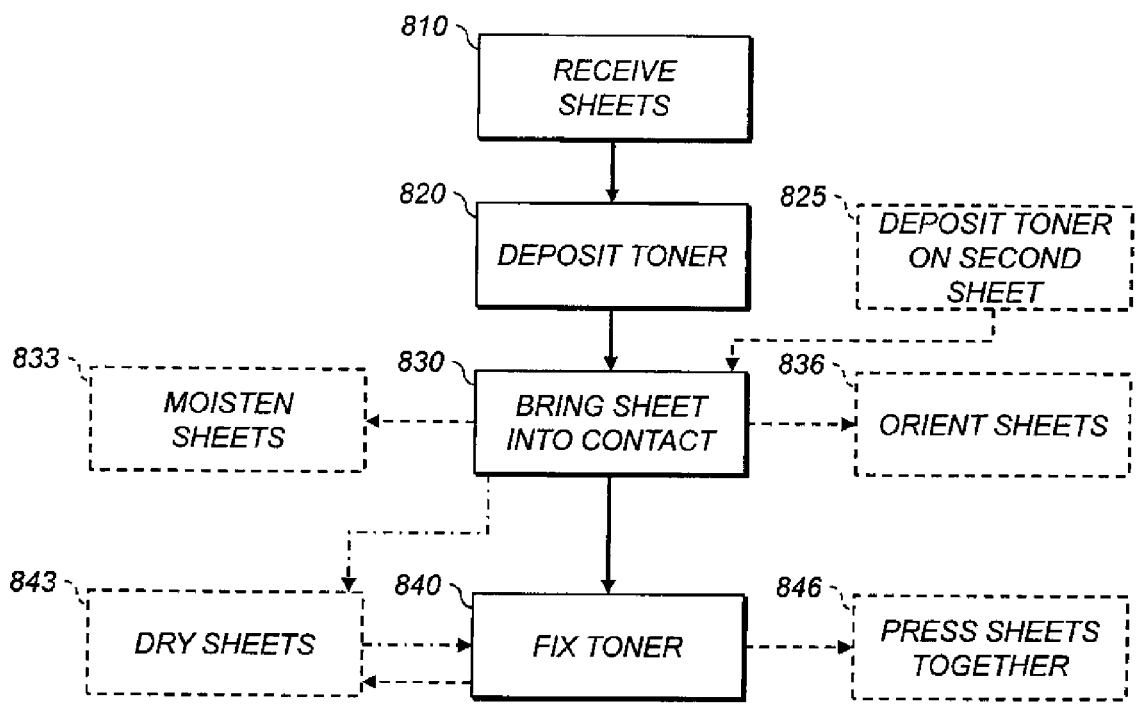
FIG. 8 shows methods of forming a structural laminate according to various embodiments.

FIG. 8 shows methods of forming a structural laminate according to various embodiments. The formed laminate has a selected resistance to a first stress applied in a selected first stress direction relative to the laminate.

In various embodiments, the toner pattern is selected depending on its intended use. Different patterns are used for wraparound structures than for flat posters. Different patterns can be applied to different parts of a sheet for different mechanical properties, as described above. The strength-to-weight ratio can be increased in a desired direction compared to other directions by orienting the toner patterns. In various embodiments, the toner pattern can include spaces in which toner is not deposited. Non-toner substances or devices can be placed or formed in these spaces.

In various embodiments, tear-resistant structures are made using fiber-reinforced toner. These toners stop tears perpendicular to toner. In various embodiments, a thin toner layer is used for tear resistance. In various embodiments, a thicker toner layer is used for tear resistance and increased stiffness against bending. In various embodiments, the pattern includes separated dots to provide stiffness without tear resistance. In various embodiments, large masses of toner are used, e.g., for a paperweight. In various embodiments, relatively less toner is used for a sign. In various embodiments, relatively even less toner is used to provide tear-resistance with flexibility to a flag. In various embodiments, the pattern includes thin vertical strips of toner so that the structure will bend along one axis but not tear (e.g., to provide a similar effect to that of the US flag the Apollo 11 astronauts planted on the Moon). Processing begins with step 810.

In step 810, first and second sheets are received. The sheets can be received from a sheet feeder or a roll feeder with a chopper. The sheets can be, e.g., A4 or letter size, or can be large-format (e.g., A0), or any other size. The sheets can be webs, of which enough is unrolled to print on. This permits making structures in a continuous process by feeding two webs, or a web and a succession of cut sheets, into the printer for toner deposition and fixing. Step 810 is followed by step 820.

In step 820, a selected volume of toner particles, as discussed above, is deposited on the first sheet in a toner pattern. The deposited toner pattern is disposed over a selected first surface area of the first sheet and extends normal to the first sheet by a selected first height. Multiple areas can also be deposited. Step 820 is followed by step 830.

In optional step 825, in various embodiments, before the bringing-into-contact step 830, a second selected volume of toner particles is deposited on the second sheet in a second toner pattern. The second toner pattern is disposed over a selected second surface area of the second sheet and extends normal to the second sheet by a selected second height. In various embodiments, the second toner pattern corresponds to the first toner pattern, and the first and second sheets are brought into contact so that the first and second toner patterns are in register, whereby, after fixing the first and second sheets, the first and second sheets are separated by more than the second height. Step 825 is followed by step 830.

In step 830, the second sheet, or toner thereon, is brought into contact with the toner pattern. Step 830 is followed by step 840, optional step 836, or optional step 843, and can include step 833. Paper or other media sheets that are not paper can be used with various embodiments, including sheets that do not have grain.

In optional step 833, in various embodiments, the first and second sheets are moistened before the bringing-into-contact step. These embodiments are used with step 843, discussed below.

In various embodiments, the first and second sheets have respective long-grain directions. When the sheets are paper, the grain arises from the paper production process, in which the majority of the cellulose fibers of the paper are oriented in a common direction before drying. This creates paper with a stronger direction ("long grain") along which the fibers are substantially oriented. The paper also has a more flexible but weaker direction ("short grain") substantially perpendicular to the orientation of the fibers. Paper is more resistant to tearing in the short-grain direction than in the long-grain direction, but more resistant to bending in the long-grain direction than in the short-grain direction. Accordingly, the relative orientations with which individual sheets are bonded together will affect the mechanical properties of the laminate.

In these embodiments, optional step 836 can be part of bringing-into-contact step 830. Step 836 includes orienting the second sheet with respect to the first sheet so the respective long-grain directions of the two sheets are substantially perpendicular. This step can also be used with single, overlapping, or side-by-side embodiments. Perpendicular long-grain orientations can provide increased strength. Laminates with perpendicular-long-grain sheets are similar to plywood, which has perpendicular wood grains. These laminates can provide isotropic strength. In an example, for a dimensionally stable laminate, the sheets are bonded with the long-grain direction of each sheet substantially perpendicular to the long-grain direction of the sheet(s) immediately adjacent in the laminate.

In various embodiments, the bringing-into-contact step 830 includes orienting the second sheet with respect to the first sheet so the respective long-grain directions of the two sheets are substantially parallel. In various of these embodiments, each respective long-grain direction is within about 45° of the first stress direction. Parallel long-grain orientations can provide increased strength along an axis parallel to the orientation of the fibers, as discussed above. Parallel long-grain orientations can also provide flexibility along an axis perpendicular to the long-grain direction. Laminates with parallel-long-grain sheets are similar to engineered beams that provide uniaxial strength. In an example, for a composite material that is to be rolled into a cylindrical column, the toner pattern is oriented along the long-grain direction of each sheet, and the individual sheets are bonded with their long-grain directions substantially parallel.

In various embodiments using sheets with long-grain directions, one of the respective long-grain directions is within about 45° of the first stress direction, and the other of the respective long-grain directions is within about 45° of a second stress direction. In various embodiments, one of the respective long-grain directions, the first stress direction, and the direction of the first contiguous regions of toner are all within about 45° of each other; and the other of the respective long-grain directions, the second stress direction, and the direction of the second contiguous regions of toner are all within about 45° of each other. Any of these embodiments can be used with overlapping or side-by-side embodiments.

In step 840, the structural laminate is formed by fixing the toner pattern to produce a fixed toner pattern that adheres the second sheet to the first sheet. The fixed toner pattern includes one or more first contiguous regions of toner extending in a direction within about 45° of the stress direction, so that the contiguous regions resist the applied stress.

In various embodiments, the toner pattern is selected to distribute strain along different paths within predetermined limits. For example, a spiderweb toner pattern can be used to distribute across the laminate strain from stress applied in a small area of the laminate.

In various embodiments, toner is deposited on the front side, or the back side, of each sheet. Toner can be fixed to toner on the other sheet or to the other sheet itself. Sheets can be brought into contact (step 830) and fused (step 840) in either order. Toner on one sheet can be fixed before step 830, and toner on the other sheet fixed after step 830. Other embodiments of fixing and bringing into contact are described above with reference to FIG. 4. In various embodiments, after fixing step 840, 5%-35%, or 10%-25%, of each of the respective surface areas of the first and second sheets are covered with toner. This structure, with toner bonds between the sheets over only some of the area of the sheets, provides strength with reduced weight compared to a solid toner fill over the full surface area of each sheet.

In various embodiments, the toner is or includes a thermoplastic. In various embodiments, the toner is or includes a thermoset toner that thermosets into a glassy phase in which it has a Young's modulus of more than 1 GPa. In these embodiments, fixing step 840 includes curing the thermoset toner on the first sheet. Curing can be performed by exposure to ultraviolet radiation or to fixing chemicals. In various embodiments, the toner has a surface energy of between about 35 ergs/cm² and about 45 ergs/cm². The lower limit imparts strength to the bond between toner and media. The upper limit causes water to shed, providing increased strength to the laminate and reducing the probability of the laminate's holding water and weakening the sheets.

In various embodiments, the volume of toner after fixing is substantially equal to the selected volume. The fixed toner pattern is disposed over a second surface area of the first sheet greater than the selected first surface area. The fixed toner pattern extends normal to the first sheet by a selected second height less than the first height. The structural laminate has a selected mechanical property in a structural area including the second surface area higher than the corresponding mechanical property of either the first or the second sheet in the structural area. The laminate can have different mechanical properties or values of one property in the structural area in different directions.

In various embodiments, the mechanical property is one of those listed in Table 1, below. Properties marked (*) can be controlled independently with the grain of the sheet ("machine direction" or "MD"; the long-grain direction) or across the grain of the sheet ("transverse direction" or "TD"; the short-grain direction). Where non-metric units are used, metric units are given in parentheses.

TABLE 1

Mechanical properties

| Property | Typical units | Description |
| --- | --- | --- |
| Elmendorf Tear Resistance (*) | gram force | The average force required to continue tearing a sample once the tear has been started. For paper, this is described in TAPPI test procedure T 414 and WI 576. For plastic films, this is described in ASTM standard D1922-09. Force is applied normal to the surface of the paper by a falling pendulum. Elmendorf results can also be reported in lbf or mN. |
| Tensile Strength (*) | lbf/in (N/m) | How much force is required to extend the sample by a certain length. TAPPI T494 om-96 |
| Stretch (*) | % | How much a test sample extended in length before breaking, T494 om-96 |
| Tensile Energy Absorption (*) | ft · lbf/ft² (J/m²) | Indicative of the durability of the sheet under repetitive load. The work done per unit area when stretching the sample until it breaks (SCAN-CM 31: 77, 2005). Can be computed as the integral of tensile force applied plotted vs. percentage elongation at that force. T494 om-96 |
| Mullen Burst strength | psi (Pa) | The pressure at which the sample is punctured normal to its face. ASTM D774-97. |
| Stiffness (*) | gf · cm or N · m | Another name for bending moment. The moment applied to a sample to produce a desired deflection at a desired radius. Per TAPPI T489. |
| Bending moment in a given direction | Pa | The strain for a stress applied in a way that will bend the laminate. For example, Young's modulus. |
| Shear strength in a given direction | Pa | The point on the stress-strain curve at which yielding has occurred under a shear stress. |

Other examples of mechanical properties include edge-crush strength or resistance (N, lbf, kN/m per ISO 3037, lb/in), related to the force required to crush a board standing on its edge. Another example is the compression of a sample in an edge-crush test before it buckles or bursts. See also ASTM D642-76, ASTM D 4169-86, which relate to testing of packaging under compression.

In various embodiments, the formed laminate further has a selected resistance to a second stress applied in a selected second stress direction relative to the laminate, the toner pattern also includes second contiguous regions of toner within about 45° of the second stress direction, and the second contiguous regions of toner overlap with the first contiguous regions of toner. These embodiments are referred to herein as "overlapping embodiments." Embodiments with toner patterns that include only the first contiguous regions of toner are referred to herein as "single embodiments."

In various embodiments, the structural laminate includes a first region having the first response to the first applied stress and a second region having a selected second response to a second stress applied in a selected second stress direction relative to the laminate, the toner pattern also includes second contiguous regions of toner within about 45° of the second stress direction, the first contiguous regions are disposed within the first region, and the second contiguous regions are disposed within the second region. These embodiments are referred to herein as "side-by-side embodiments." Step 840 can be followed by optional step 843, or include optional step 846.

In step 843, in various embodiments using moist sheets (step 833), after fixing step 840, the first and second sheets are dried (actively or passively). The fixed sheets are retained in a selected shape during drying. Step 843 can also be performed after step 830, before fixing step 840 (shown with dash-dot arrows). In an example of forming a laminate useful as a column, the sheets are brought into contact (step 830), rolled into a cylindrical shape and dried (step 843), then fixed together (step 840).

In step 846, in various embodiments, the first and second sheets are pressed together during fixing step 840. In these embodiments, respective, different toner patterns are deposited (steps 820, 825) on facing sides of the first and second sheets. Each toner pattern includes a plurality of spaced-apart protrusions, as discussed below with respect to FIGS. 9, 10. When the sheets are pressed together, they begin to bend.

Figure 9:
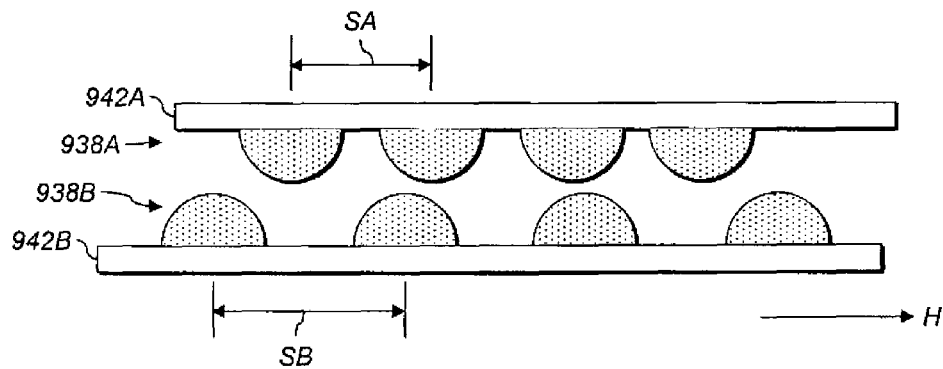
FIG. 9 shows an example of sheets with toner bumps before fixing according to various embodiments.

FIG. 9 shows an example of sheets with toner bumps before fixing the sheets together. These are as described, e.g., in step 846 (FIG. 8). Media sheets 942A, 942B carry respective toner bumps or protrusions 938A, 938B, which can be fixed or not. Bumps are spaced apart in fixing direction H, which is the direction in which the sheets will pass through a fixing unit. Bumps 93 8A on sheet 942A are spaced apart by spacing SA. Bumps 938B on sheet 942B are spaced apart by spacing SB. Spacings SA and SB are different. In various embodiments, the bumps are tacked or fixed on each sheet individually before fixing the sheets together. This provides strength to the bumps so that they can exert force on the sheets that will bend the sheets while the sheets are being fixed together.

Figure 10:
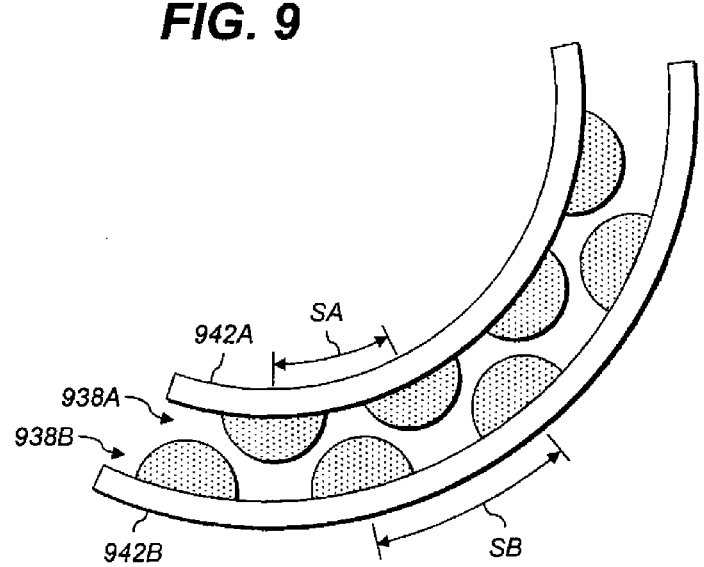
FIG. 10 shows the sheets of FIG. 9 after fixing.

FIG. 10 shows sheets 942A, 942B after passing through a fixer (e.g., fixing device 60, FIG. 1, with rotatable fusing roller 62 and pressure roller 64). Bumps 938A, 938B and spacings SA, SB are as shown in FIG. 9. As sheets 942A, 942B pass through the fixing device, the bumps press against each other. In order for the bumps to nest to permit the sheets to press together, the sheets bend towards the finer-pitch sheet 942A.

Figure 25A:
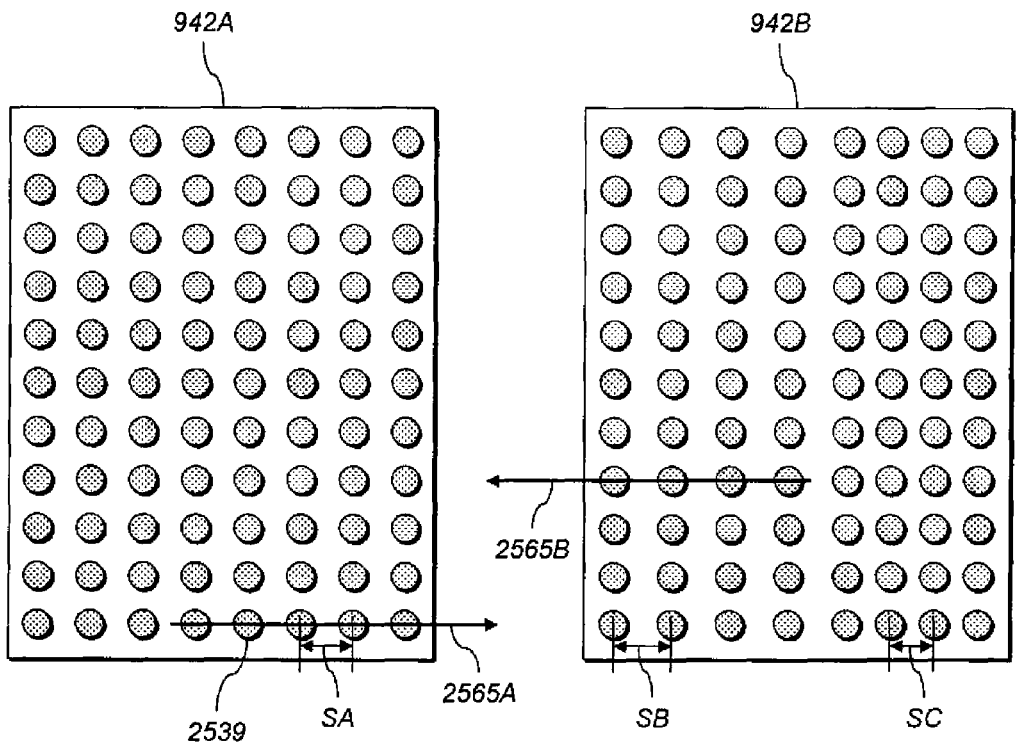
FIG. 25A shows an example of toner patterns for bending sheets.

FIG. 25A shows an example of toner patterns for bending sheets. The toner sides of sheets 942A, 942B are shown; sheets 942A, 942B will be fixed by bringing the shown faces into contact, graphically represented in perspective in FIG. 25B. The respective deposited toner patterns on sheets 942A, 942B include respective spaced-apart fixed toner protrusions

Figure 25B:
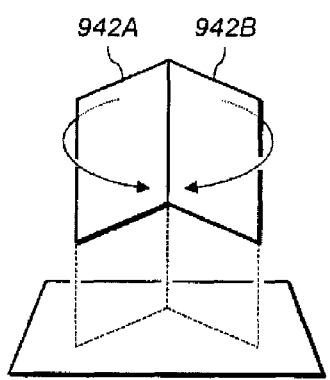
FIG. 25B is an exemplary perspective of how sheets in FIG. 25A are brought into contact.
Figure 25C:
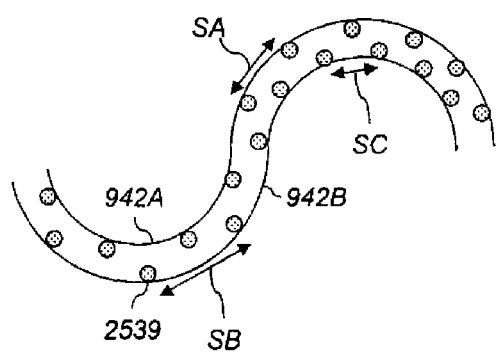
FIG. 25C is an exemplary cross-section of the sheets of FIG. 25A after fixing.

2539, i.e., toner areas arranged to protrude from sheets 942A, 942B. On sheet 942A, along axis 2565A (or ray or line; in a selected direction), protrusions 2539 are spaced apart by spacing SA. On sheet 942B, axis 2565B corresponds to axis 2565A, since the right edge of sheet 942A will be closest to the left edge of sheet 942B when they are brought together face-to-face. Axis 2565B is shown offset vertically from axis 2565A for drawing clarity. On the left portion of sheet 942B, protrusions 2539 are spaced apart by spacing SB, where SB>SA. On the right portion of sheet 942B, protrusions 2539 are spaced apart by spacing SC, where SC<SA. That is, the spacing of protrusions disposed over the first sheet along a selected axis is different than the spacing between protrusions disposed over the second sheet along an axis corresponding to the second axis. As a result, when sheets 942A, 942B are fixed together, they will form a doubly-curved structure with sheet 942A on the inside radius for part of the structure, and sheet 942B on the inside radius for part of the structure. FIG. 25C is a cross-section of the resulting structure, including sheets 942A, 942B along a line parallel to axes 2565A, 2565B (FIG. 25A). The number and size of toner bumps are not shown to the same scale as FIG. 25A. Spacings SA, SB and SC are circumferential, but are represented graphically as line segments in this figure.

o o o

Figure 13:
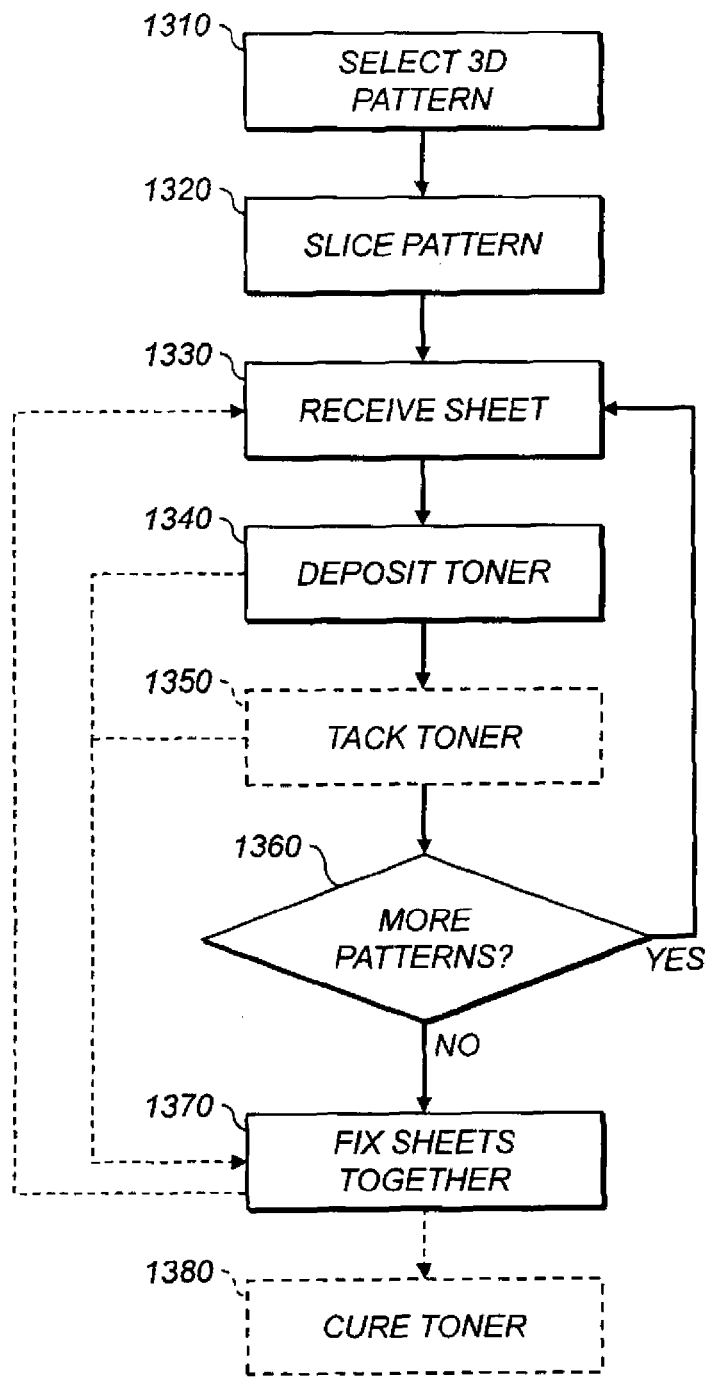
FIG. 13 shows methods of forming a structural element according to various embodiments.
Figure 14:
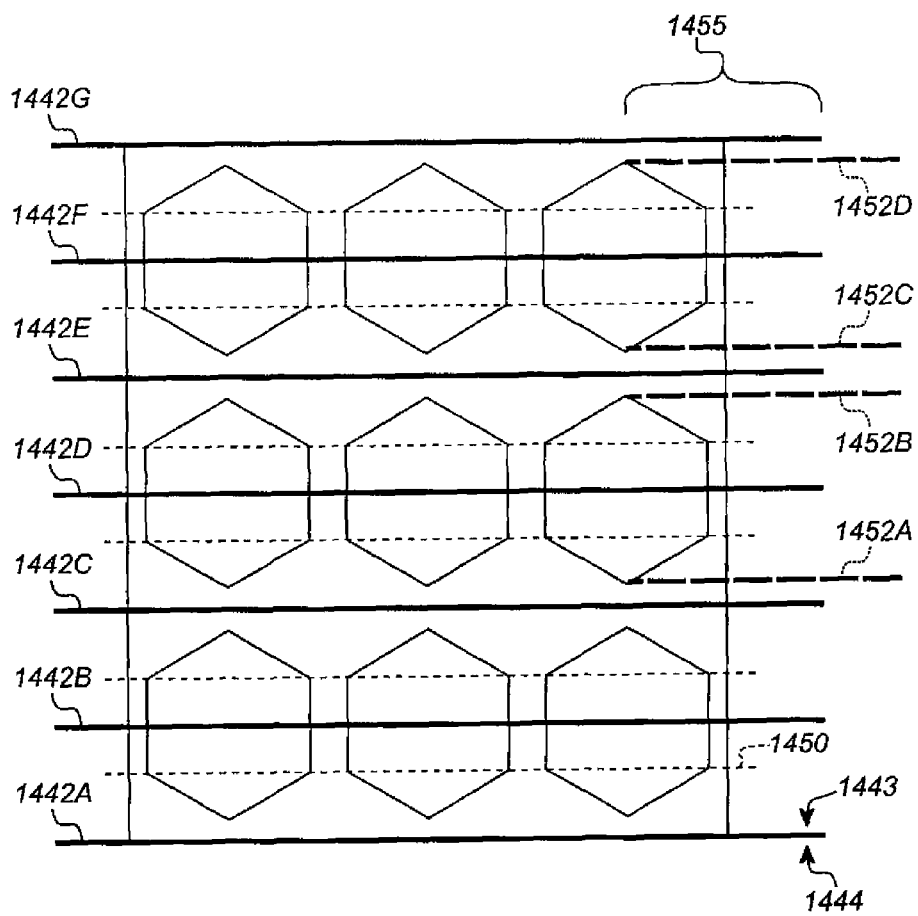
FIG. 14 is an elevational cross-section of an example of a structural element.

FIG. 13 shows methods of forming a structural element according to various embodiments. Processing begins with step 1310. The structural element is similar to a crystal structure made with toner, shot through with sheets, e.g., as shown in FIG. 14. Sheets do not have to extend all the way through the structural element, and can be offset normal to the sheet at overlap regions.

In step 1310, a 3D aim toner pattern is selected or received. A 3D aim toner pattern is any pattern specifying laydown of toner that, for its production, requires more than two axes of control over where toner particles are placed. For example, the 3D aim toner pattern can be a regular pattern of toner segments connecting the vertices of cubes tiled in three dimensions. A 3D aim toner pattern can be derived similarly from the unit cell of any crystal. Periodic or aperiodic patterns can be used. Patterns can include structures that, when viewed from specific angles, form shapes, faces, or other features of interest to humans. Step 1310 is followed by step 1320.

In step 1320, using a processor, the 3D aim toner pattern is automatically sliced into a plurality of 2D aim toner patterns. "2D" here refers to the fact that toner corresponding to a 2D aim toner pattern can be deposited by a printer that has only two axes of control over where toner particles are deposited. A 2D aim toner pattern specifies corresponding thickness of the deposited toner after fixing, so the controller determines a corresponding thickness for each 2D aim toner pattern. Different 2D aim toner patterns can have the same or different thicknesses. Thickness can vary across an aim toner pattern if the printer to be used to deposit the toner is able to control thickness by other than a third axis of position control of the toner. For example, a multichannel printer can deposit toner of different thicknesses in different areas, or a multitoning printer can deposit different densities of toner at each (X, Y) position. Slicing can be performed by finding planes in the 3D aim toner pattern that are the thinnest, or by finding convex regions of toner that can be cut by a sheet. The 2D aim toner patterns can be oriented along any plane or planes in the 3D aim toner pattern. Additional constraints, e.g., on sheet angle, can be received from an operator. Step 1320 is followed by step 1330.

In step 1330, a sheet is received. The sheet is capable of receiving toner deposited thereon. Step 1330 is followed by step 1340.

In step 1340, toner corresponding to a selected one of the 2D aim toner patterns is deposited on the received sheet to form a corresponding 2D deposited toner pattern. Step 1340 is followed by decision step 1360 or optional step 1350, or by step 1370.

In optional step 1350, the deposited toner is tacked to be retained more strongly on the sheet than before tacking. Tacking can include fixing, and can be performed by applying heat, radiation, or chemicals. Step 1350 is followed by decision step 1360, or optionally by step 1370.

Decision step 1360 decides whether there are more 2D aim toner patterns to process. If so, the next step is step 1330. If not, the next step is step 1370. In this way, the receiving through fixing steps are repeated until toner corresponding to each of the 2D aim toner patterns has been deposited onto a sheet.

In step 1370, the sheets bearing the 2D toner patterns (tacked or not) are fixed together to form the structural element having toner corresponding to the 3D pattern. After fixing, the fixed toner on each sheet has a thickness substantially corresponding to the determined thickness of the corresponding 2D aim toner pattern. In various embodiments, one or more sheets can be fixed or tacked before this step, as discussed above with respect to step 1350, and all sheets can be fused together substantially simultaneously. In various embodiments, the structural element can be built incrementally by fixing each sheet to the previously-fixed sheets before depositing toner on the next sheet. If the latter, step 1370 can be followed by step 1330 as long as sheets remain, or by decision step 1360 (arrow not shown). Step 1370 can be followed by optional step 1380.

In step 1380, the toner is cured. This step can be used, e.g., with thermoset toner that thermosets into a glassy phase in which it has a Young's modulus of more than 1 GPa. Curing can be accomplished by UV or chemical exposure, as described herein. Toner can also be thermoplastic.

FIG. 14 is an elevational cross-section of an example of a structural element. The structural element has a hexagonal lattice cell, repeated throughout the element. Sheets 1442A, 1442B, 1442C, 1442D, 1442E, 1442F, 1442G are as described above. Each sheet has first and second sides; for clarity, first side 1443 and second side 1444 are only shown for sheet 1442A. In this example, sheets 1442B, 1442C, 1442D, 1442E, 1442F, 1442G have their first and second sides oriented as does sheet 1442A. Toner is deposited on both sides of each sheet 1442A, 1442B, 1442C, 1442D, 1442E, 1442F, 1442G. Dashed lines show the boundaries of each sheet's toner pattern. For example, between sheet 1442A and line 1450 is the toner pattern deposited on first side 1443 of sheet 1442A. Between line 1450 and sheet 1442B is the toner pattern deposited on the second side of sheet 1442B. For clarity, the other dashed lines are not labeled. The result of building these toner patterns and fixing the sheets together is a matrix of lattice cells formed of toner, with sheets throughout.

Sheets 1452A, 1452B, 1452C, 1452D (represented graphically as heavy dashed lines) are additional sheets offset normal to sheets 1442C, 1442D, 1442E, 1442F in overlap region 1455. That is, they are at a different position in the structure in a direction normal to, e.g., the first side of sheet 1442C. Offsetting sheets can provide additional strength, or permit building structures larger than a single sheet. This can also permit bonding sheets together. Toner-deposition step 1340 (FIG. 13) can include depositing filler material before depositing the toner to support the toner during deposition and fusing. This permits depositing overhanging toner structures on a sheet.

In various embodiments, the 3D toner pattern includes a plurality of spatial regions. The regions can be adjacent or not. Each region has a respective, different unit cell. The unit cell is repeated to fill the region.

Figure 15:
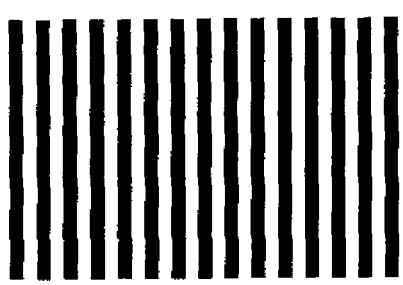
FIGS. 15-22 show toner patterns according to various embodiments.
Figure 16:
Figure 17:
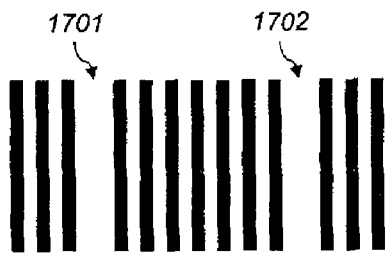
Figure 18:
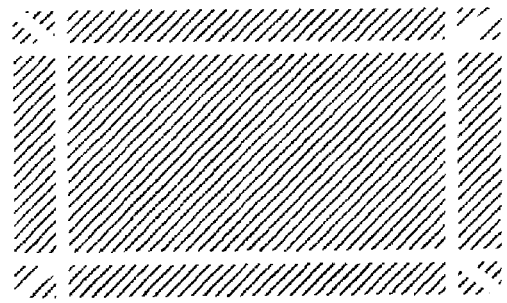
Figure 19:
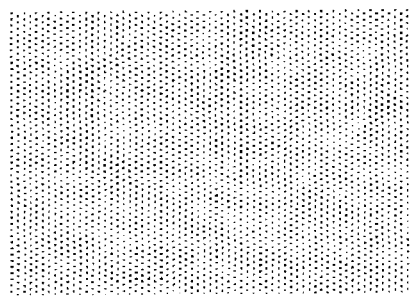
Figure 20:
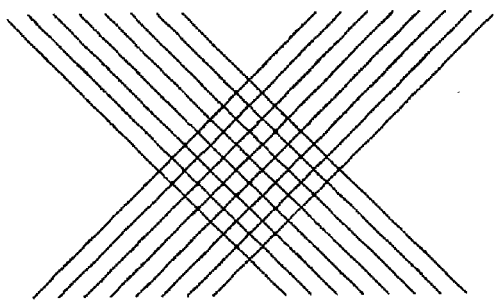
Figure 21:
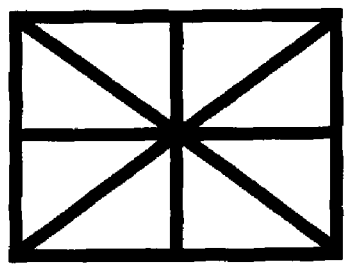
Figure 22:
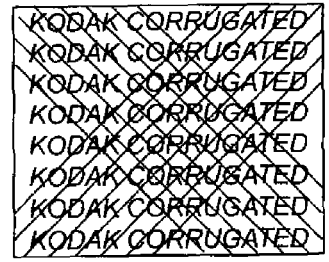

FIGS. 15-22 show toner patterns according to various embodiments. In these figures, black shows the location of the toner, and white shows where there is no toner. FIGS. 15 and 16 show toner patterns with regions extending only in one direction. FIG. 17 shows a pattern useful for making a sign supported on a wire horseshoe. Gaps 1701, 1702 are left in the pattern to permit passing the wire through. FIG. 18 shows a pattern useful for making a box. Each face of the folded box has diagonal regions to resist buckling. Gaps in the toner pattern permit folding. FIG. 19 shows bumps (represented graphically as black dots) rather than stripes. The bumps can be aligned along particular directions, or distributed uniformly, randomly, pseudo-randomly, or according to a dither pattern such as a blue-noise dither. FIG. 20 shows a pattern with overlapping regions in two directions. FIG. 21 shows patterns with overlapping regions in more than two directions. FIG. 22 shows a pattern including readable content. Other patterns or shapes can also be used in the toner patterns, e.g., barcodes or other machine-readable designs, text in a human language, dingbats, or other symbols.

In an example, the cover of a book includes toner patterns like those shown in FIG. 20. The spine of a book includes toner patterns like those in FIG. 17 between gaps 1701, 1702, including gaps 1701, 1702. This permits readily opening the book or bending the spine while turning pages, and provides rigidity to the cover of the book.

Figure 23:
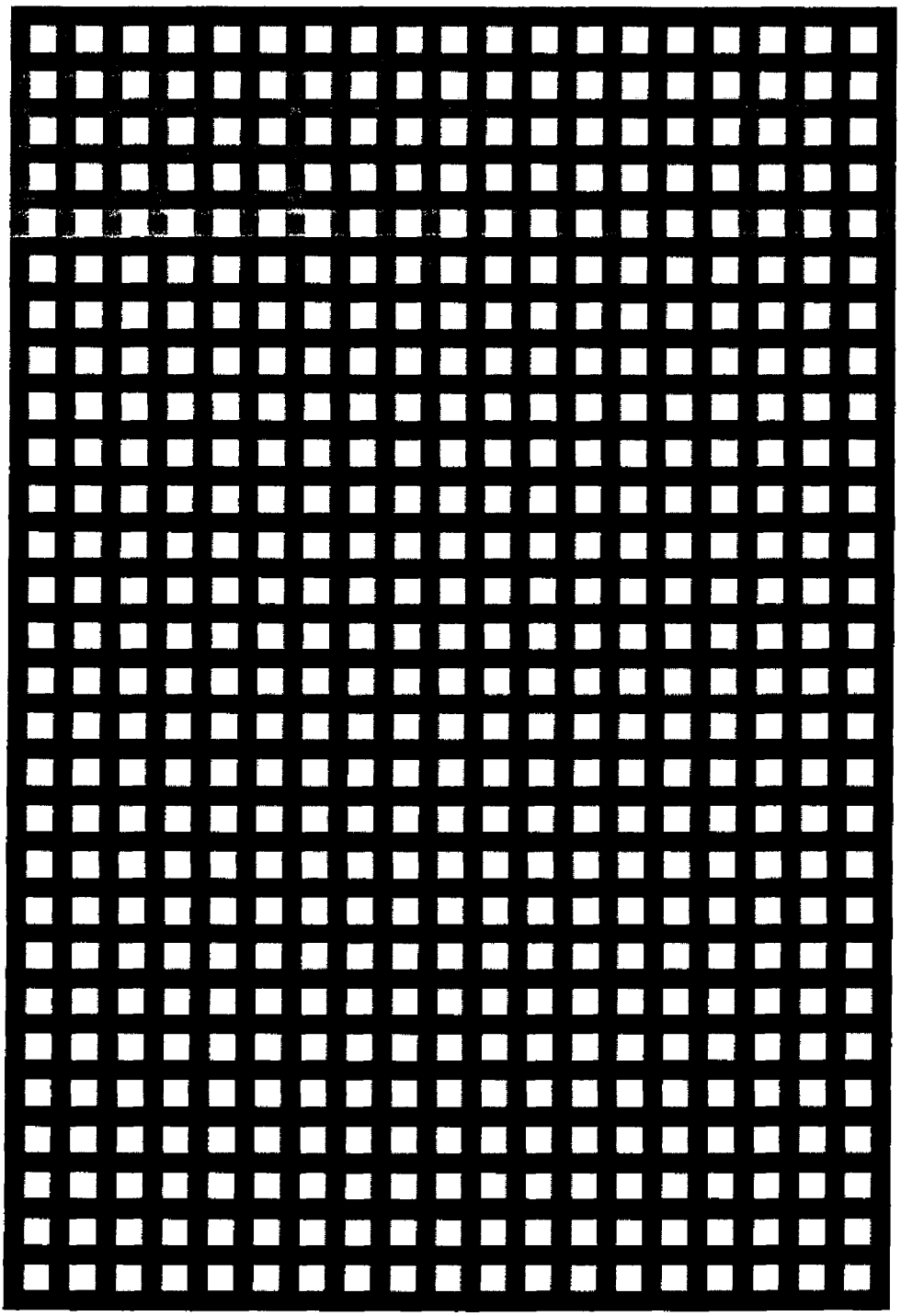
FIG. 23 represents an inventive pattern of toner that was printed on a printer.

FIG. 23 represents an inventive pattern of toner that was printed on a KODAK NEXPRESS printer. The pattern is shown at a reduced scale. Ten samples were made. Each sample included a cover sheet bearing toner patterns forming text and an overcoat layer of large clear toner ("DMCL"; 20 µm mean diameter toner particles). Each sample also included either two or four corrugation sheets printed with the pattern shown. Each corrugation sheet was printed with two patterned layers of DMCL, with a fixing step for the individual sheet after each layer was printed (similar to the steps shown in FIGS. 12A-12D). Each sample was printed on A3 uncoated Mondi Color Copy Paper (90 g/m$^2$=0.0048" thick), trimmed to approximately A4 dimensions, and stacked. The samples were fixed at 140° C. in an IBICO PL-260IC pouch laminator (400 W; 260 mm laminating width). Five samples were three-ply (cover sheet plus two corrugation sheets) and five were five-ply (cover sheet plus four corrugation sheets). Of the five-ply samples, three were fixed once, and two were fixed twice by passing them through the laminator twice.

The samples were tested using industry-standard test procedures.

Test standards and results are given in the following tables. Measurements and averages of the measurements from the indicated number of samples are reported. Samples were sliced for some tests; for example, the tensile strength tests used samples 1"W×6"L.

Comparative samples were also tested. A 16 pt (0.016")-thick solid-bleached sulfate (SBS) paperboard was used for the comparative tests. SBS is a high-quality grade of paperboard useful for bearing high-quality printed images. Some grades are also useful as a moisture barrier in packaging. Each SBS measurement was taken on a respective test specimen.

Tables 2-5 show sample thicknesses measured per ASTM D374.

TABLE 2

Sheet thickness (mils), 16pt SBS (comparative)

| Measurement | Measured value |
|---|---|
| 1 | 16.26 |
| 2 | 16.27 |
| 3 | 16.25 |
| 4 | 16.22 |
| 5 | 16.39 |
| 6 | 16.54 |
| 7 | 16.49 |
| 8 | 16.4 |
| 9 | 16.27 |
| 10 | 16.28 |
| Avg. | 16.3 |
| Std. Dev. | 0.1 |

TABLE 3

Sheet thickness (mils), 3-ply (inventive)

| Measurement | Measured value | Sheet number |
|---|---|---|
| 1 | 14.34 | 1 |
| 2 | 14.4 | 1 |
| 3 | 14.47 | 2 |
| 4 | 14.28 | 2 |
| 5 | 14.45 | 3 |
| 6 | 14.41 | 3 |
| 7 | 14.26 | 4 |
| 8 | 14.28 | 4 |
| 9 | 14.23 | 5 |
| 10 | 14.33 | 5 |
| Avg. | 14.3 | |
| Std. Dev. | 0.1 | |

TABLE 4

Sheet thickness (mils), 5-ply corrugated, fused twice (inventive)

| Measurement | Measured value | Sheet number |
|---|---|---|
| 1 | 24.44 | 2 |
| 2 | 24.71 | 2 |
| 3 | 24.58 | 5 |
| 4 | 24.59 | 5 |
| Avg. | 24.6 | |
| Std. Dev. | 0.1 | |

TABLE 5

Sheet thickness (mils), 5-ply corrugated, fused once (inventive)

| Measurement | Measured value | Sheet number |
|---|---|---|
| 1 | 29.8 | 1 |
| 2 | 29.76 | 1 |
| 3 | 29.58 | 3 |
| 4 | 29.3 | 3 |
| 5 | 29.54 | 4 |
| 6 | 29.67 | 4 |
| Avg. | 29.6 | |
| Std. Dev. | 0.2 | |

Tables 6 and 7 show Elmendorf tear resistance in the transverse and machine directions, respectively. These are measured per ASTM D1922. In this and subsequent tables, empty cells represent measurements not taken.

TABLE 6

Elmendorf tear resistance (g), transverse direction

| Sample # | 16pt SBS (comparative) | 3-ply (inventive) | 5-ply, fused once (inventive) | 5-ply, fused twice (inventive) |
|---|---|---|---|---|
| 1 | 268.8 | 192 | 492.8 | |
| 2 | 268.8 | 204.8 | | 396.8 |
| 3 | 268.8 | 204.8 | 524.8 | |
| 4 | 268.8 | 204.8 | 492.8 | |
| 5 | 268.8 | 204.8 | | 396.8 |
| Avg. | 268.8 | 202.2 | 503.5 | 396.8 |
| Std. dev. | 0.0 | 5.7 | 18.5 | 0.0 |

TABLE 7

Elmendorf tear resistance (g), machine direction

| Sample # | 16pt SBS (comparative) | 3-ply (inventive) | 5-ply, fused once (inventive) | 5-ply, fused twice (inventive) |
|---|---|---|---|---|
| 1 | 268.8 | 204.8 | 524.8 | |
| 2 | 224 | 192 | | 428.8 |
| 3 | 236.8 | 204.8 | 614.4 | |
| 4 | 268.8 | 204.8 | 537.6 | |
| 5 | 236.8 | 192 | | 396.8 |
| Avg. | 247.0 | 199.7 | 558.9 | 412.8 |
| Std. dev. | 20.5 | 7.0 | 48.5 | 22.6 |

Tables 8 and 9 show tensile strength in the transverse and the machine direction, respectively. Tables 10 and 11 show stretch in the transverse and the machine direction, respectively. Tables 12 and 13 show tensile energy absorption in the transverse and the machine direction, respectively. These tests were performed according to TAPPI T494om-96, but using five six-inch samples instead of ten seven-inch samples.

TABLE 8

Tensile strength (lbf/in), transverse direction

| Sample # | 16pt SBS (comparative) | 3-ply (inventive) | 5-ply, fused once (inventive) | 5-ply, fused twice (inventive) |
|---|---|---|---|---|
| 1 | 43.8 | 63.2 | 120.5 | |
| 2 | 42.1 | 62 | | 103.1 |
| 3 | 42.3 | 62.4 | 123.1 | |
| 4 | 43.1 | 62.7 | 119.9 | |
| 5 | 43.3 | 62.5 | | 101.9 |
| Avg. | 42.9 | 62.6 | 121.2 | 102.5 |
| Std. dev. | 0.7 | 0.4 | 1.7 | 0.8 |

TABLE 9

Tensile strength (lbf/in), machine direction

| Sample # | 16pt SBS (comparative) | 3-ply (inventive) | 5-ply, fused once (inventive) | 5-ply, fused twice (inventive) |
|---|---|---|---|---|
| 1 | 89.1 | 108.3 | 203.3 | |
| 2 | 84 | 99.6 | | 173.5 |
| 3 | 86.4 | 90.9 | 202.7 | |
| 4 | 87.3 | 105.1 | 184.3 | |
| 5 | 81.5 | 98.7 | | 170.9 |
| Avg. | 85.7 | 100.5 | 196.8 | 172.2 |
| Std. dev. | 3.0 | 6.7 | 10.8 | 1.8 |

TABLE 10

Stretch (%), transverse direction

| Sample # | 16pt SBS (comparative) | 3-ply (inventive) | 5-ply, fused once (inventive) | 5-ply, fused twice (inventive) |
|---|---|---|---|---|
| 1 | 4.25 | 6.46 | 7.01 | |
| 2 | 3.95 | 6.62 | | 6.69 |
| 3 | 4.05 | 7 | 6.48 | |
| 4 | 4.14 | 7.06 | 6.51 | |
| 5 | 4.39 | 6.83 | | 6.64 |
| Avg. | 4.2 | 6.8 | 6.7 | 6.7 |
| Std. dev. | 0.2 | 0.3 | 0.3 | 0.0 |

TABLE 11

Stretch (%), machine direction

| Sample # | 16pt SBS (comparative) | 3-ply (inventive) | 5-ply, fused once (inventive) | 5-ply, fused twice (inventive) |
|---|---|---|---|---|
| 1 | 2.11 | 2.9 | 3.34 | |
| 2 | 2.08 | 2.55 | | 2.78 |
| 3 | 2.01 | 2.18 | 2.99 | |
| 4 | 2.25 | 2.75 | 2.57 | |
| 5 | 1.79 | 2.37 | | 2.98 |
| Avg. | 2.0 | 2.6 | 3.0 | 2.9 |
| Std. dev. | 0.2 | 0.3 | 0.4 | 0.1 |

TABLE 12

Tensile energy absorption (ft · lb/ft$^2$), transverse direction

| Sample # | 16pt SBS (comparative) | 3-ply (inventive) | 5-ply, fused once (inventive) | 5-ply, fused twice (inventive) |
|---|---|---|---|---|
| 1 | 16.08 | 34.34 | 71.55 | |
| 2 | 13.71 | 34.35 | | 58.08 |
| 3 | 14.67 | 35.85 | 67.71 | |
| 4 | 15.46 | 35.14 | 65.16 | |
| 5 | 15.93 | 35.14 | | 57.19 |
| Avg. | 15.2 | 35.0 | 68.1 | 57.6 |
| Std. dev. | 1.0 | 0.6 | 3.2 | 0.6 |

TABLE 13

Tensile energy absorption (ft · lb/ft$^2$), machine direction

| Sample # | 16pt SBS (comparative) | 3-ply (inventive) | 5-ply, fused once (inventive) | 5-ply, fused twice (inventive) |
|---|---|---|---|---|
| 1 | 14.46 | 23.61 | 52.5 | |
| 2 | 12.91 | 18.02 | | 35.82 |
| 3 | 12.98 | 13.87 | 45.57 | |
| 4 | 14.83 | 21.28 | 34.84 | |
| 5 | 10.5 | 16.23 | | 38.9 |
| Avg. | 13.1 | 18.6 | 44.3 | 37.4 |
| Std. dev. | 1.7 | 3.9 | 8.9 | 2.2 |

Table 14 shows the results of a Mullen burst test per ASTM D774. Not all samples were tested due to the number of samples available. The laminates were stronger than the SBS sample.

TABLE 14

Mullen burst strength (psi)

| Sample # | 16pt SBS (comparative) | 3-ply (inventive) | 5-ply, fused once (inventive) | 5-ply, fused twice (inventive) |
|---|---|---|---|---|
| 1 | 115 | 130 | | |
| 2 | 110 | 130 | | |
| 3 | 115 | | 220 | |
| 4 | | 135 | 220 | |
| 5 | | | | 185 |
| Avg. | 113.3 | 131.7 | 220.0 | 185.0 |
| Std. dev. | 2.9 | 2.9 | 0.0 | N/A |

Tables 15 and 16 show stiffness in the transverse and machine direction, respectively. This was tested per TAPPI T489. Some samples were not tested, and others tested multiple times, due to the availability of samples.

TABLE 15

Stiffness (g · cm), transverse direction

| Sample # | 16pt SBS (comparative) | 3-ply (inventive) | 5-ply, fused once (inventive) | 5-ply, fused twice (inventive) |
|---|---|---|---|---|
| 1 | 92.6 | | 454 | |
| 2 | | | | 243 |
| 2 | 86.3 | | | 246 |
| 3 | 84.6 | 52.5 | | |
| 3 | | 52.1 | | |
| 4 | | | | |
| 5 | | 54.1 | | |
| Avg. | 87.8 | 52.9 | 454.0 | 244.5 |
| Std. dev. | 4.2 | 1.1 | N/A | 2.1 |

TABLE 16

Stiffness (g · cm), machine direction

| Sample # | 16pt SBS (comparative) | 3-ply (inventive) | 5-ply, fused once (inventive) | 5-ply, fused twice (inventive) |
|---|---|---|---|---|
| 1 | 179.1 | | 804 | |
| 2 | 169.1 | | | 447 |
| 2 | | | | 444 |
| 3 | 179.1 | 103.8 | | |
| 3 | | 104.3 | | |
| 4 | | | | |
| 5 | | 104.3 | | |
| Avg. | 175.8 | 104.1 | 804 | 445.5 |
| Std. dev. | 5.8 | 0.3 | N/A | 2.1 |

Figure 24:
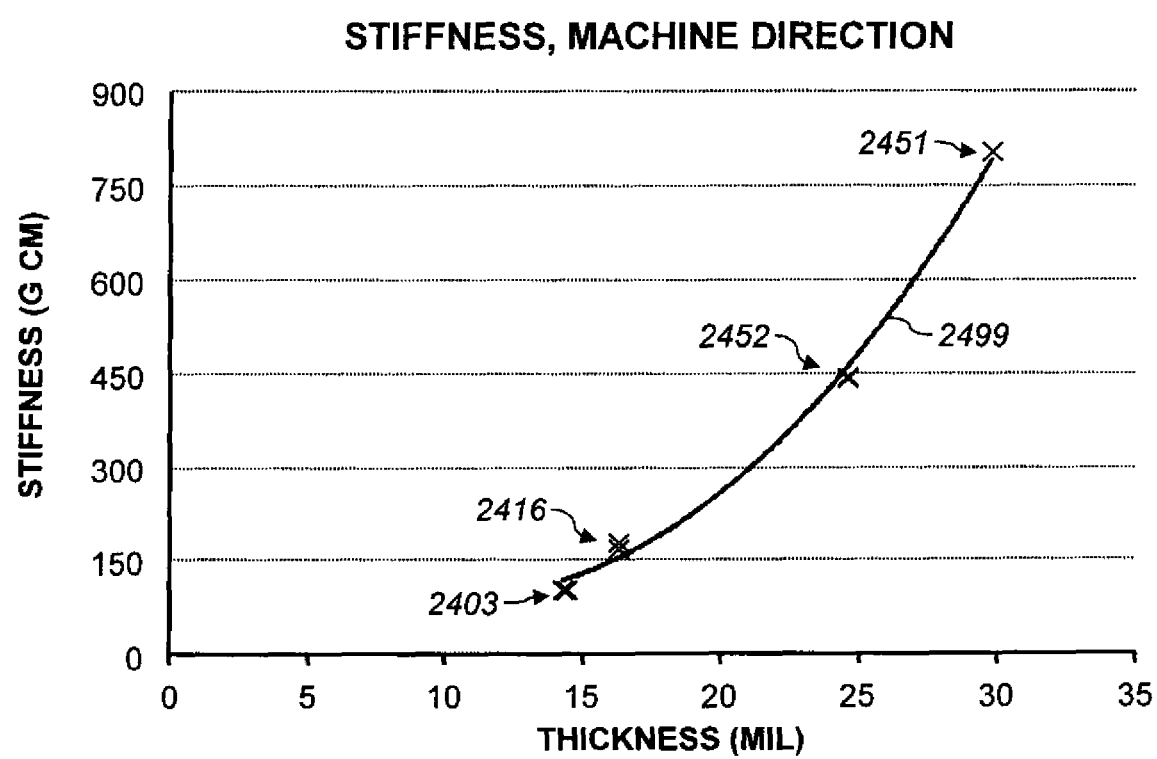
FIG. 24 shows machine-direction stiffness plotted against thickness for measured samples printed with the pattern represented in FIG. 23.

FIG. 24 shows machine-direction stiffness plotted against thickness for all measured samples. Samples 2403 are 3-ply, samples 2416 are 16 pt SBS, sample 2451 is 5-ply, once-fused, and samples 2452 are 5-ply, twice-fused. Polynomial trendline 2499 has the formula $$y = 1.9294x^2 - 41.634x + 319.61$$

and fits the data with $R^2 = 0.9934$. This shows the strong dependence of stiffness on thickness. Laminates according to various embodiments can provide higher thickness than standard paperboard (e.g., samples 2416) and still be lightweight. Moreover, the laminates can be recycled by standard, well-understood toner recycling processes.

The laminates also had higher tensile strength, tensile-energy absorption, and Mullen burst strength than the SBS. This indicates that the laminates are suitable not only for uses requiring rigidity, but also for uses requiring robustness under handling. The laminates can be readily manufactured using toner printers to permit the use of custom-designed, strong, lightweight, robust packages or other structures.

Significant improvements were observed in mechanical properties. For tensile strength, tensile energy absorption, and stiffness, the transverse-direction tests exhibited larger improvement (inventive corrugation vs. comparative SBS) than the machine-direction tests. This demonstrates that various embodiments permit controlling the direction in which the sheets are strengthened. Since the pattern can be customized to the load, it is not required to use more toner than required to meet mechanical requirements. This can save weight over other types of board.

Figure 26:
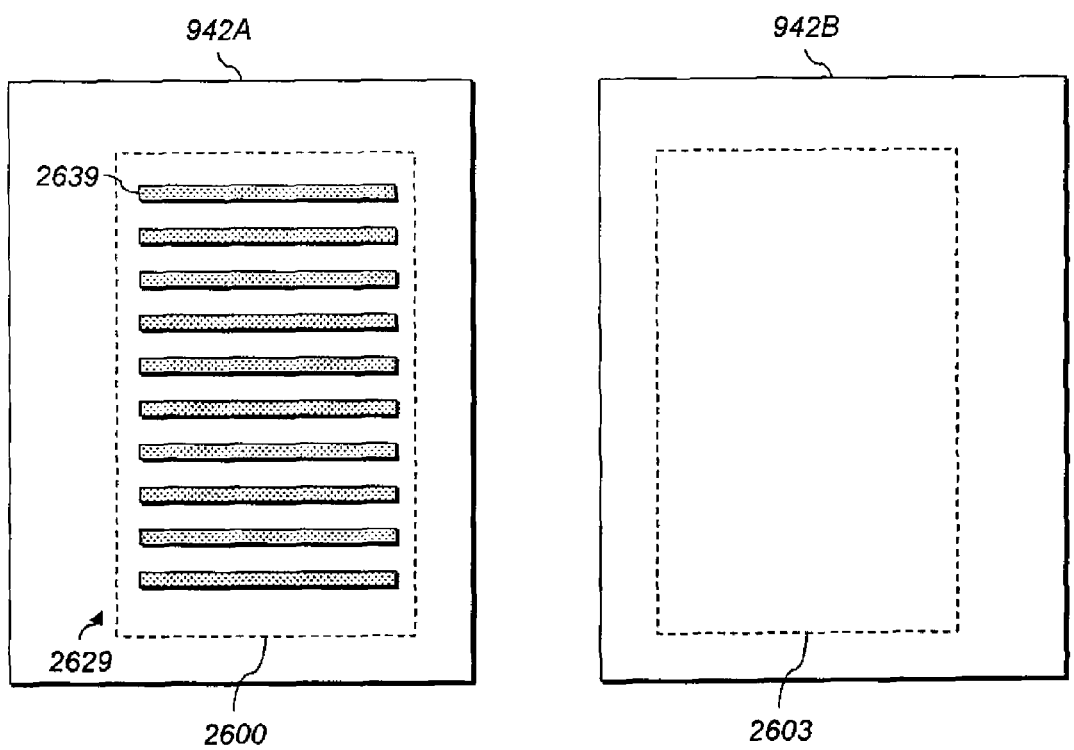
FIG. 26 shows examples of structural areas according to various embodiments.

FIG. 26 shows examples of structural areas according to various embodiments. Sheets 942A and 942B are to be assembled illustrated faces together, as shown in FIG. 25B. Sheet 942A has structural area 2600 over which fixed toner pattern 2629 is disposed. Pattern 2629 includes fixed toner regions 2639 (for clarity, only one is labeled). Sheet 942B has structural area 2603, which will overlay area 2600 when sheet 942B is brought into contact with toner regions 2639 or sheet 942A. When assembled, the structural laminate has a structural area having the same footprint as overlaid areas 2600, 2603. In that area, bending moment, tensile strength, or other properties are improved, compared to the same properties in either area 2600 or area 2603.

Figure 27:
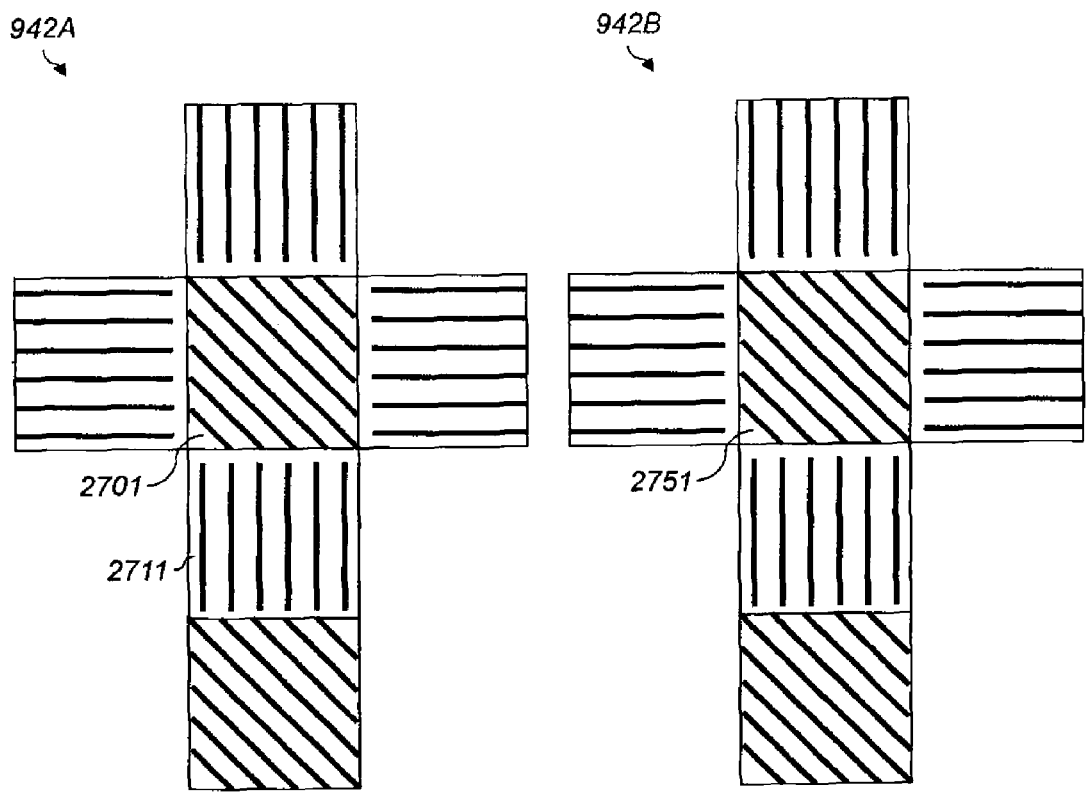
FIG. 27 shows an example of toner patterns on two sheets.
Figure 28:
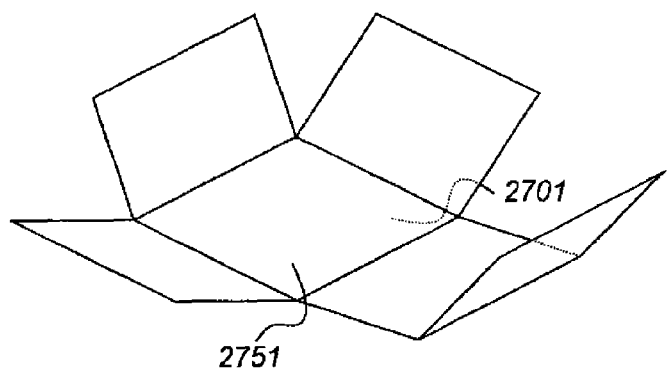
FIG. 28 shows the sheets of FIG. 27 fixed together and in the process of being folded into a box.

FIG. 27 shows an example of toner patterns on sheets 942A, 942B. The black areas represent toner to be deposited. The sheets are attached with the illustrated sides together, as shown in FIG. 25B. When attached, the sheets are folded to form a box, as shown in FIG. 28. For example, faces 2701, 2751 ("face" referring to what is a face of the box after folding) are brought into contact, and toner is fixed, to form a laminate with a crosshatch pattern of toner. This pattern resists bending. As shown in FIG. 28, after folding, faces 2701, 2751 together form the bottom of the box. (For clarity, the toner patterns are not shown in FIG. 28.) Similarly, a crosshatch pattern is used on the top of the box. Toner regions that extend vertically after folding are used for the sides of the box, e.g., face 2711. This pattern resists crushing but permits the box sides to bend slightly to conform to the load.

Sheets with a pattern similar to that shown in FIG. 27 were printed, fixed together, and folded. The resulting structure had qualitatively higher resistance to bending on the crosshatch pattern (e.g., faces 2701, 2751) than on the vertical-stripe pattern (e.g., face 2711).

In an example, the toner pattern is selected to increase the bending moment of a laminate that will form the side of a container along a normal to the face of the laminate. Toner regions oriented in what will be the vertical (stacking) direction of the container resist edge crushing. As discussed above, stress applied normal to the side of the container can have components in the plane of the laminate. Therefore, diagonal regions in the toner pattern can be used in addition to the vertical regions to resist the in-plane shear components, and thus resist buckling.

o o o

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting. The word "or" is used in this disclosure in a non-exclusive sense, unless otherwise explicitly noted.

The invention has been described in detail with particular reference to certain preferred embodiments thereof, but it will be understood that variations, combinations, and modifications can be effected by a person of ordinary skill in the art within the spirit and scope of the invention.

PARTS LIST 21 charger
21a voltage source
22 exposure subsystem
23 toning station
23a voltage source
25 photoreceptor
25a voltage source
31, 32, 33, 34, 35, 36 printing module
38 print image
38A, 38B unfixed toner
39 fused image
39A, 39B fixed toner
40 supply unit
42, 42A, 42B receiver
50 transfer subsystem
60 fixing device
62 fusing roller
64 pressure roller
66 fusing nip
68 release fluid application substation
69 output tray
70 finisher
81 transport web
86 cleaning station
99 logic and control unit (LCU)
100 printer
210 data-processing system
220 peripheral system
230 user-interface system
240 data-storage system
301 box blank
302 fold line
303 front surface
304 tab
305 back surface
306 flute
310, 311 liner sheet
312 fluted sheet
408 mark sheet(s) step
410 receive sheets step
420 deposit toner step
425 deposit toner on second sheet step
427 fix toner step
430 bring sheet into contact step
440 fix toner step
442 mark sheet(s) step
444 deform laminate step
510, 620, 730 region of toner
810 receive sheets step
820 deposit toner step
825 deposit toner on second sheet step
830 bring sheet into contact step
833 moisten sheets step
836 orient sheets step
840 fix toner step
843 dry sheets step
846 press sheets together step
938A, 938B, 938C, 938H toner bump
942A, 942B sheet
1138T, 1138X air gap
1310 select 3d pattern step
1320 slice pattern step
1330 receive sheet step
1340 deposit toner step
1350 tack toner step
1360 more patterns? decision step
1370 fix sheets together step
1380 cure toner step
1442A, 1442B sheet
1442C, 1442D sheet
1442E, 1442F, 1442G sheet
1443 first side
1444 second side
1450 line
1452A, 1452B sheet
1452C, 1452D sheet
1455 overlap region
1701, 1702 gap
2403, 2416 samples
2451 sample
2452 samples
2499 trendline
2539 toner protrusion
2565A, 2565B axis
2600, 2603 structural area
2629 fixed toner pattern
2639 fixed toner region
2701, 2751 face
2711 side
A bend axis
B1, B2 bend direction
D1, D2 pattern direction
F direction of extension of flutes 306
H fixing direction
HA height
S stress direction
SA, SB, SC spacing
X, Y, Z direction

The invention claimed is:

1. A method of forming a structural laminate having a selected resistance to a first stress applied in a selected first stress direction relative to the structural laminate, the method comprising:
receiving first and second sheets;
depositing on the first sheet a selected volume of toner to form a first deposited toner pattern, the first deposited toner pattern being disposed over a selected first surface area of the first sheet and extending normal to the first sheet by a selected first height;
depositing on the second sheet a selected volume of toner to form a second deposited toner pattern, the second deposited toner pattern being disposed over a selected first surface area of the second sheet and extending normal to the second sheet by a selected second height;
moistening the first and second sheets;
bringing the second sheet, or second deposited toner thereon, into contact with the deposited toner pattern;
forming the structural laminate by fixing the deposited toner patterns to produce a fixed toner pattern that adheres the second sheet to the first sheet, wherein the fixed toner pattern includes one or more first contiguous regions of toner extending in a direction within about 45° of the first stress direction, so that the one or more first contiguous regions resist the first applied stress;

drying the first and second sheets after the forming step, wherein the drying step includes retaining the fixed sheets in a selected shape while drying the sheets.

2. The method according to claim 1, wherein:

the fixed volume of the deposited toner of one or both of the first sheet and the second sheet is substantially equal to the selected volume of toner of one or both of the first sheet and the second sheet;

the fixed toner pattern is disposed over a second surface area of the first sheet greater than the selected first surface area;

the fixed toner pattern extends normal to the first sheet by a selected second height less than the selected first height; and the structural laminate has a higher selected mechanical property in a structural area including the second surface area than the corresponding mechanical property of either the first or the second sheet in the structural area.

3. The method according to claim 2, wherein the mechanical property is selected from the group consisting of Elmendorf tear resistance, tensile strength, stretch, tensile energy absorption, Mullen burst strength, stiffness, bending moment in a given direction, shear strength in a given direction, edge crush strength, and edge crush compression.

4. The method according to claim 1, wherein the structural laminate further has a selected resistance to a second stress applied in a selected second stress direction relative to the structural laminate, the fixed toner pattern also includes second contiguous regions of toner within about 45° of the second stress direction, and the second contiguous regions of toner overlap with the one or more first contiguous regions of toner.

5. The method according to claim 4, wherein the first and second sheets have respective long-grain directions, and the bringing-into-contact step includes orienting the second sheet with respect to the first sheet so the respective long-grain directions of the two sheets are substantially perpendicular.

6. The method according to claim 4, wherein the first and second sheets have respective long-grain directions, one of the respective long-grain directions is within about 45° of the first stress direction, and the other of the respective long-grain directions is within about 45° of the second stress direction.

7. The method according to claim 4, wherein the first and second sheets have respective long-grain directions;

one of the respective long-grain directions, the first stress direction, and the direction of the one or more first contiguous regions of toner are all within about 45° of each other; and the other of the respective long-grain directions, the second stress direction, and the direction of the second contiguous regions of toner are all within about 45° of each other.

8. The method according to claim 1, wherein the structural laminate includes a first region having a first response to the first applied stress and a second region having a selected second response to a second stress applied in a selected second stress direction relative to the structural laminate, the deposited toner pattern also includes one or more second contiguous regions of toner within about 45° of the second stress direction, the one or more first contiguous regions are disposed within the first region, and the one or more second contiguous regions are disposed within the second region.

9. The method according to claim 8, wherein the first and second sheets have respective long-grain directions, and the bringing-into-contact step includes orienting the second sheet with respect to the first sheet so the respective long-grain directions of the two sheets are substantially perpendicular.

10. The method according to claim 8, wherein the first and second sheets have respective long-grain directions, one of the respective long-grain directions is within about 45° of the first stress direction, and the other of the respective long-grain directions is within about 45° of the second stress direction.

11. The method according to claim 8, wherein the first and second sheets have respective long-grain directions;

one of the respective long-grain directions, the first stress direction, and the direction of the one or more first contiguous regions of toner are all within about 45° of each other; and the other of the respective long-grain directions, the second stress direction, and the direction of the one or more second contiguous regions of toner are all within about 45° of each other.

12. The method according to claim 1, wherein after the fixing step 65%-95% of respective surface areas of the first and second sheets are not covered with toner.

13. The method according to claim 12, wherein after the fixing step 75%-90% of the respective surface areas of the first and second sheets are not covered with toner.

14. The method according to claim 1, wherein the toner is thermoplastic.

15. The method according to claim 1, wherein the toner is a thermoset toner that thermosets into a glassy phase in which it has a Young's modulus of more than 1 GPa, and wherein the fixing step includes curing the thermoset toner on the first sheet.

16. The method according to claim 1, further including, before the bringing-into-contact step, depositing on the second sheet a second selected volume of toner to form a third deposited toner pattern, the third deposited toner pattern being disposed over a selected second surface area of the second sheet and extending normal to the second sheet by a selected second height.

17. The method according to claim 16, wherein the third deposited toner pattern corresponds to the first deposited toner pattern, and the first and second sheets are brought into contact so that the first deposited toner pattern and the third deposited toner patterns are in register, whereby after fixing the first and second sheets are separated by more than the second height.

18. The method according to claim 1, wherein the first and second sheets have respective long-grain directions, and the bringing-into-contact step includes orienting the second sheet with respect to the first sheet so the respective long-grain directions of the two sheets are substantially parallel.

19. The method according to claim 18, wherein each of the respective long-grain directions is within about 45° of the first stress direction.

20. The method according to claim 16, wherein the deposited toner patterns on the first and second sheets are unfixed during the bringing-into-contact step, and the fixing step includes fixing the deposited toner patterns on the first and second sheets simultaneously or sequentially.

21. The method according to claim 16, wherein the second deposited toner pattern is deposited on a front face of the second sheet, and a back face of the second sheet is brought into contact with the deposited toner pattern on the first sheet.

22. The method according to claim 16, wherein the deposited toner pattern includes spaced-apart toner protrusions arranged along a selected axis, the second deposited toner pattern includes spaced-apart toner protrusions arranged along an axis corresponding to the selected axis, and the spacing between protrusions disposed over the first sheet is different from the spacing between protrusions disposed over the second sheet.

* * * * *